United States Patent [19]

Watkins et al.

[11] Patent Number: 5,247,648
[45] Date of Patent: Sep. 21, 1993

[54] MAINTAINING DATA COHERENCY BETWEEN A CENTRAL CACHE, AN I/O CACHE AND A MEMORY

[75] Inventors: John Watkins, Sunnyvale; David Labuda, Half Moon Bay; William C. Van Loo, Palo Alto, all of Calif.

[73] Assignee: Sun Microsystems, Inc., Mountain View, Calif.

[21] Appl. No.: 879,162

[22] Filed: Apr. 30, 1992

Related U.S. Application Data

[63] Continuation of Ser. No. 508,939, Apr. 12, 1990, abandoned.

[51] Int. Cl.⁵ .................. G06F 12/08; G06F 13/00
[52] U.S. Cl. .................. 395/425; 364/DIG. 1;
364/243.4; 364/243.41; 364/243.44; 364/243.5;
364/245.5; 364/245.6; 364/246; 364/246.3;
364/242.3; 364/242.31
[58] Field of Search .................. 395/425, 250, 275

[56] References Cited

U.S. PATENT DOCUMENTS

| | | | |
|---|---|---|---|
| 4,300,192 | 11/1981 | Couleur et al. | 395/425 |
| 4,445,174 | 4/1984 | Fletcher | 395/425 |
| 4,489,378 | 12/1984 | Dixon et al. | 395/425 |
| 4,622,631 | 11/1986 | Frank et al. | 395/425 |
| 4,669,043 | 5/1987 | Kaplinsky | 395/425 |
| 4,713,755 | 12/1987 | Worley, Jr. et al. | 395/425 |
| 4,847,804 | 7/1989 | Shaffer et al. | 395/425 |
| 4,965,717 | 10/1990 | Cutts, Jr. et al. | 395/425 |
| 4,977,582 | 12/1990 | Nichols et al. | 375/118 |
| 5,045,996 | 9/1991 | Barth et al. | 395/425 |
| 5,072,369 | 12/1991 | Theus et al. | 395/425 |
| 5,091,846 | 2/1992 | Sachs et al. | 395/250 |
| 5,113,514 | 5/1992 | Albonesi et al. | 395/425 |

OTHER PUBLICATIONS

Mano, Morris M. *Computer System Architecture* ©1982 pp. 495, 503, 508, 509.

*Primary Examiner*—Paul V. Kulik
*Attorney, Agent, or Firm*—Blakely Sokoloff Taylor Zafman

[57] ABSTRACT

An I/O write back cache memory and a data coherency method is provided to a computer system having a cache and a main memory. The data coherency method includes partitioning the main memory into memory segments, dynamically assigning and reassigning the ownership of the memory segments either to the cache memory or the I/O write back cache memory. The ownership of the memory segments controls the accessibility and cacheability of the memory segments for read and write cycles performed by the CPU and I/O devices. During reassignment, various data management actions are taken to ensure data coherency. As a result, the I/O devices can perform read and write cycles addressed against the cache and main memory in a manner that increases system performance with minimal increase in hardware and complexity cost.

16 Claims, 14 Drawing Sheets

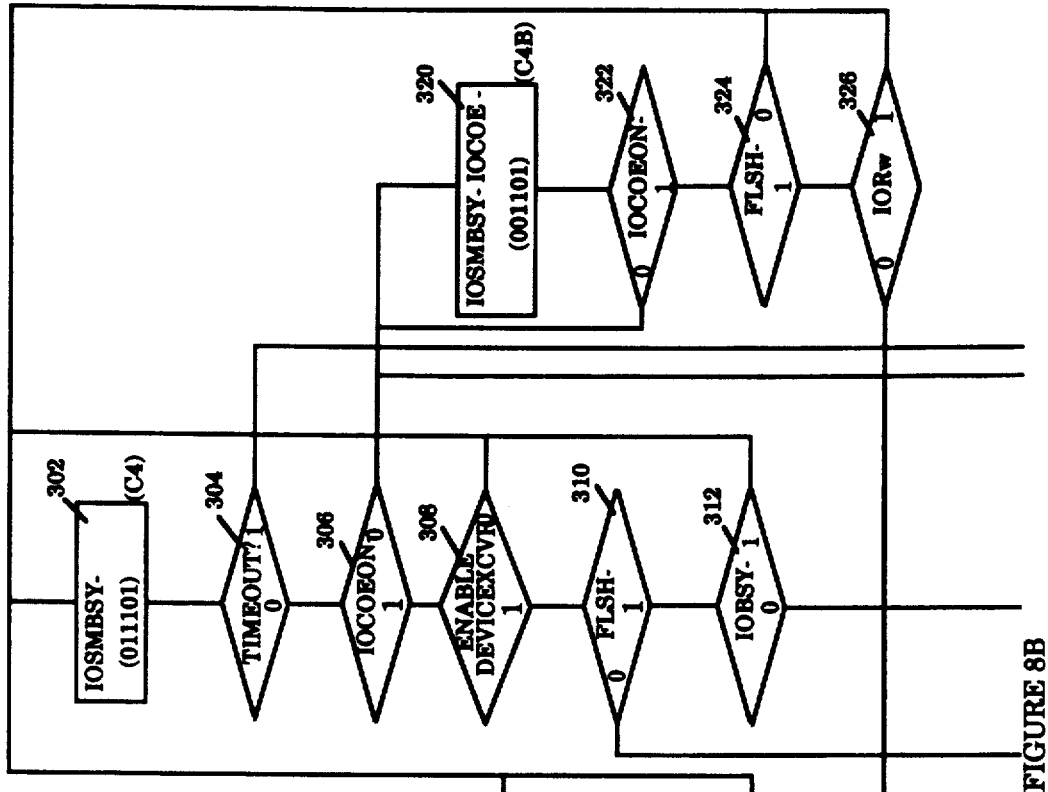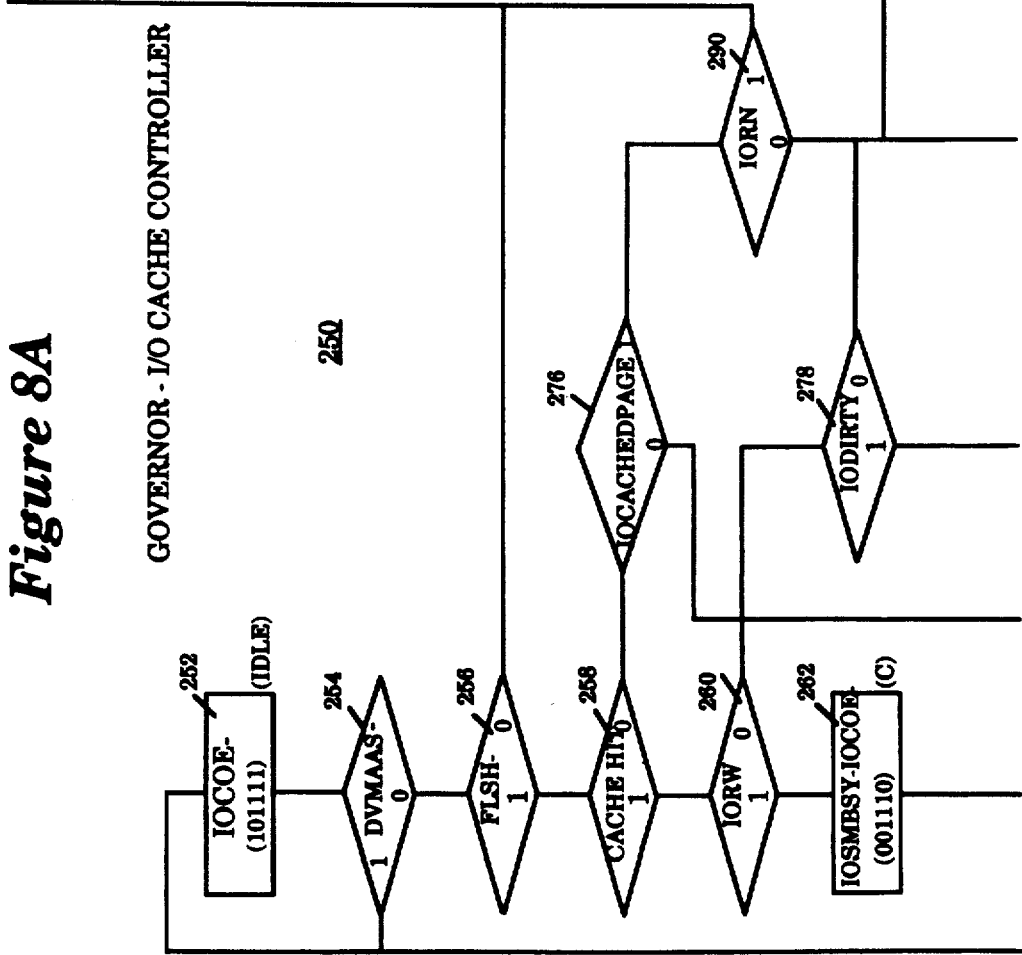
Figure 8A

MAINTAINING DATA COHERENCY BETWEEN A CENTRAL CACHE, AN I/O CACHE AND A MEMORY

This is a continuation application of U.S. patent application, Ser. No. 07/508,939, filed on Apr. 12, 1990, now abandoned, which is related to U.S. patent application, Ser. No. 07/508,979, also filed on Apr. 12, 1990.

BACKGROUND OF THE INVENTION

1. FIELD OF THE INVENTION

The present invention is related to the field of computer systems, in particular, cache and cache coherency mechanisms.

2. RELATED ART

Traditionally, control of data movement between external devices and the main memory of a computer system is done in either one of two ways. First, data movement can be controlled by the CPU directly reading from the device (to internal CPU registers) or writing from registers to the device. This type of control is called Programmed Input/Output (I/O). The second type of control is with data movement being controlled, for the most part, by the external device itself. This type of control is called Direct Memory Access (DMA), or, if the device accesses memory through virtual addresses, Direct Virtual Memory Access (DVMA). Coordination between the external device and the CPU is typically handled either by message passing or through interrupts.

In many computer systems that employ DMA/DVMA for controlling data movement between the external devices and the main memory, system performance may be improved significantly by including a write back cache for I/O as one of the system elements. However, a problem that can arise from this strategy is maintaining data consistency between the I/O cache and the central cache. Traditional solutions to this problem place the burden of maintaining consistency either on the operating system, which causes severe performance degradation, or on the system hardware, which increases the cost and complexity of the cache design.

Thus, it is desirable to provide a data coherency solution that lessen the burden on the operating system, and yet without significantly increasing the cost and complexity of the cache design. As will be disclosed, this object and desired result is among the objects and desired results of the present invention which provides an optimized hardware and software solution to the data coherency problem between a central cache, a memory and an I/O cache.

SUMMARY OF THE INVENTION

This invention is directed to certain hardware and software improvements in computer systems which utilize a cache for increasing the throughput of Direct Memory Access (DMA) I/O on an operating system supporting multiple concurrent I/O operations.

The write back cache for I/O, which is assumed as a system element in the present invention, is a component in the computer system's Input/Output (I/O) subsystem. In a typical computer system configuration, the major system components include a Central Processing Unit (CPU), a Memory Management Unit (MIMU), an optional Cache subsystem, Main Memory, and an Input/Output (I/O) subsystem for transferring data between the memory subsystem (Cache and Main Memory) and external devices. The I/O subsystem described here supports external devices with at least two types of device interfaces: a standard system bus interface and a network control interface. The standard system bus is typically capable of supporting a variety of devices, including disk controllers, as one example.

Control of data movement between the external devices and the main memory subsystem is typically done in either of two ways. First, data movement can be controlled by the CPU directly reading from the device (to internal CPU registers) or writing from registers to the device. This type of control is called Programmed I/O. The second type of control is with data movement being controlled, for the most part, by the external device itself. This type of control is called Direct Memory Access, or, if the device accesses memory through virtual addresses (as is the case in the preferred embodiment), Direct Virtual Memory Access (DVMA). Coordination between the external device and the CPU is typically handled either by message passing or through interrupts.

The I/O Cache assumed here is a mechanism to significantly enhance the performance of DVMA (or DMA) data transfers. It is further assumed that the I/O Cache may be any of a variety of devices whose purpose is to temporarily buffer data being transferred between DVMA devices and the system's cache and memory subsystem.

In the present invention, the problem of maintaining data consistency between an I/O cache and a CPU cache is solved through a unique combination of hardware and software support, which is collectively called "Consistency Controls". The term "Consistency Controls" as used below will be meant to include all associated controls, I/O Cache arrays, CPU Cache arrays, data paths, and diagnostic and programming support necessary to implement an efficient data consistency mechanism between the CPU cache data and I/O Cache data.

DVMA device classifications

In order to support the proper operation of the I/O Cache, the operating system divides all DVMA or DMA I/O devices on the system into 3 classes. These classes of devices are each treated differently by the operating system, but all devices within a class are treated identically by the routines that support the I/O Cache operation.

Class 1 devices are characterized by their sequential I/O to a dynamic buffer in system memory. They are high throughput devices, such as magnetic disk and tape, and thus increased system performance can be achieved by properly cacheing their data in the I/O Cache. They always perform I/O via sequential DMA access to a specified buffer, and communicate with the operating system via shared memory outside the data buffer. In all cases, the data buffer used by a Class 1 device is dynamically allocated, so the operating system must allocate and deallocate the buffers for each operation.

Class 2 devices are characterized by their I/O to multiple, static data buffers. This class includes networking devices, which typically use a ring buffer scheme for sending and receiving network packets. Class 2 devices do not allocate and deallocate buffers per operation. Instead, a set of statically allocated data buffers is repeatedly used to perform I/O operations. These devices must perform sequential DMA within a data buffer, but they can be accessing several data buffers simultaneously in an interleaved fashion. Class 2 devices are also high throughput devices, so it is beneficial to system performance to have their data cached in the I/O Cache.

Class 3 devices are characterized by either non-sequential DMA accesses to their data buffers, or throughput that is too low to gain noticeable system performance form cacheing their data in the I/O Cache. The operating system is designed to have Class 3 devices bypass the I/O Cache entirely, so their data is never cached in the I/O Cache. Such data may or may not be cached in the Central Cache used by the CPU.

When DMA devices in any of the three classes employ a virtual addressing space, then these devices are called Direct Virtual Memory Access (DVMA) devices. Within the preferred embodiment, all I/O devices which are the subject of this description are DVMA devices. However, this description may be modified to include Direct Memory Access (DMA) devices either as a substitute for DVMA devices or in conjunction with DVMA devices. DMA devices differ, conceptually, from DVMA devices only in their mechanisms to address data in main memory. DMA devices access memory using real (or physical) memory addresses; DVMA devices access memory through virtual memory addresses which are mapped to real addresses. The mechanism to accomplish this mapping in the preferred embodiment system is the I/O Mapper. The concepts of the I/O Cache, developed here for a system with DVMA devices, may be extended as well to a system supporting DMA devices.

Hardware Data Consistency Support for I/O Device Classes 1-3

The Consistency Controls in the present embodiment use an efficient combination of hardware and operating system commands to ensure that the CPU and each DVMA Class 1, 2, and 3 device accesses consistent data. There are three distinct problems in maintaining data consistency.

First, if the Central Cache is a write back cache, then the Consistency Controls must ensure that all CPU writes into the cache are seen by DVMA devices reading data from the cache-memory subsystem.

Second, regardless of whether the Central Cache is a write through or write back (copy back) cache, the Consistency Controls must ensure that all addresses for blocks within the Central Cache which are overwritten by DVMA devices writing new data into the cache-memory subsystem, are marked as invalid or "stale" addresses within the Central Cache.

Third, since the I/O Cache acts as a temporary storage buffer for DVMA data in transit between the cache-memory subsystem and DVMA devices, the Consistency Controls must ensure that data and controls within the I/O Cache are properly reset at the conclusion of each transfer sequence by a DVMA device. In particular, for DVMA devices writing into the cache-memory subsystem, any data in the I/O Cache buffer at the end of the transfer sequence must be flushed into memory. For DVMA devices reading from the cache-memory subsystem, any valid read data left in the buffer at the end of the transfer sequence must be invalidated.

Within the Consistency Controls, Class 3 DVMA devices resolve these three requirements by bypassing the I/O Cache on all DVMA accesses and, instead, accessing data directly from the Central Cache (or Main Memory, if the DVMA data is non-cacheable for the Central Cache).

For Class 1 and Class 2 DVMA devices, the first and second requirements are efficiently solved within the Consistency Controls by the use of hardware controls which "snoop" into the Central Cache upon every I/O Cache "miss" on a block of data. When a DVMA read request "misses" the I/O Cache, the block "miss" address is checked against the Central Cache. If a matching address is found, this block of data is copied from the Central Cache into the I/O Cache while bypassing the required "miss" data to the DVMA device. Similarly, when a DVMA write request "misses" the I/O Cache, the block "miss" address is also checked against the Central Cache. If a matching address is found, this block of data is invalidated within the Central Cache. This data consistency mechanism is efficient in that the frequency with which Class 1 and 2 DVMA devices interfere with the CPU for access to the CPU cache is dramatically reduced: only I/O Cache miss cycles require Central Cache snooping.

The third requirement for Class 1 and Class 2 DVMA devices is solved by hardware and software interaction, through the use of a Flush I/O Cache command issued by the CPU at the conclusion of a DVMA device transfer sequence. In summary, the Flush command addresses a block within the I/O Cache. If this block is valid and modified, then the contents of the block are written back into memory. If the block is valid, it is marked invalid. If the block is invalid, no action is taken. If the mapping of the DVMA device address space into the I/O Cache Arrays is properly specified, then the number of I/O Cache blocks to be flushed at the conclusion of a DVMA device transfer sequence will be minimal. The proper action of the Flush command depends on operating system conventions and constraints, which are outlined in the following sections.

Data Consistency Requirements

In response to the partial data consistency supported by the hardware, the operating system must logically divide the physical address space of the system into segments of size M bytes, where M is the larger of the cache line size of the CPU cache and the cache line size of the I/O cache. For each of these resulting segments, the operating system must abide by the following rules to prevent data inconsistencies from occurring:

1. each segment must be identified internally at any given instant of time as being owned either by the CPU cache or the I/O cache.

2. segments owned by the CPU cache can be accessed freely by the CPU, but the operating system must insure that the I/O cache contains no valid data for that segment and that no I/O cacheable DMA accesses occur to the segment while it is owned by the CPU cache.

3. segments owned by the I/O cache can be freely accessed by I/O cacheable DMA devices, but the operating system must insure that no CPU accesses to the segment occur while it is owned by the I/O cache.

Note that because of the hardware support for partial data consistency, the operating system isn't required to insure that the CPU cache contains no data from a segment owned by the I/O cache. On the contrary, instances of data from segments owned by the I/O Cache may appear valid in the CPU cache. The Operating System is only required to avoid accessing that data while the segment is owned by the I/O Cache. Eliminating the requirement to actually invalidate the data in the CPU cache when ownership of a segment is transferred to the I/O Cache tremendously increases the performance benefits of the I/O cache, and is one of the key concepts of the invention.

Operating System Consistency Guidelines

The operating system fulfills the above requirements by following these guidelines:

1. All logical I/O buffers used by the operating system that are to be marked I/O cacheable at any time must be aligned such that the lowest base 2 log(M) bits of their physical address all equal 0, and sized such that the buffer is an integral multiple of M bytes in length. This insures that any I/O cacheable buffer begins and ends on cache line boundaries in both the CPU cache and the I/O cache, and thus can be easily assigned as wholly owned by either the CPU cache or the I/O cache.

For Class 1 devices, this is accomplished by always allocating full pages of physical memory for logical I/O buffers. Full pages of physical memory always satisfy the above criteria.

For Class 2 devices, this is accomplished by explicitly padding the logical I/O buffers with unused bytes until they meet the above criteria. When the static buffers for Class 2 devices are allocated at system startup, enough additional memory is allocated so that the buffers can be aligned and sized according to the constraints.

For Class 3 devices, none of the logical I/O buffers are ever marked I/O cacheable, so the above criteria does not apply.

2. When ownership of a segment is transferred from the CPU cache to the I/O cache, the operating system must inhibit subsequent CPU accesses to that segment.

For Class 1 and 2 devices, this is accomplished by using the internal state of the operating system to mark the logical I/O buffer that segment is contained in as owned by the I/O device, and preventing any processes from generating CPU accesses to that segment. This also requires that the ownership of all segments contained in a given logical I/O buffer remain consistent at all times; the entire buffer is either owned by the CPU cache or by the I/O cache.

For Class 3 devices, ownership is never transferred to the I/O cache, so this criteria does not apply.

3. Whenever ownership of a segment is transferred from the I/O cache to the CPU cache, the operating system must flush any data for that segment out of the I/O cache, and inhibit subsequent I/O cacheable accesses to that segment.

For Class 1 devices, this is accomplished by the operating system module that deallocates the logical I/O buffers after completion of the operation. This module uses the address and size of the logical I/O buffer to calculate which cache lines of the I/O cache may contain data from segments within the logical I/O buffer, and executes a flush operation to each of those lines. Next the module invalidates the I/O cacheable mapping to the buffer, so no subsequent accesses to any segment in the buffer will be I/O cacheable. If the logical I/O buffer is later used for DMA from a Class 1 device, it is reallocated and remapped I/O Cacheable by the operating system before ownership of the buffer is transferred back to the I/O Cache.

For Class 2 devices, this is accomplished by the device driver module for the specific device. The device driver code that processes the completion of an I/O operation must perform a flush operation to the appropriate I/O cache line, based on the direction of the completed operation. The device driver must then change its internal state to mark the logical I/O buffer as owned by the CPU cache. It is up to the device driver to control the device and prevent it from making further accesses to any segments in the logical I/O buffer.

For Class 3 devices, ownership of segments in the logical I/O buffers is never transferred to the I/O cache, so the above criteria does not apply.

BRIEF DESCRIPTION OF THE DRAWINGS

FIGS. 8a-8b are two flow diagrams of a governor for the I/O cache which describes the control of the I/O Cache data busses and certain I/O Cache state machines control signals.

DETAILED DESCRIPTION OF THE INVENTION

Figure 1A:
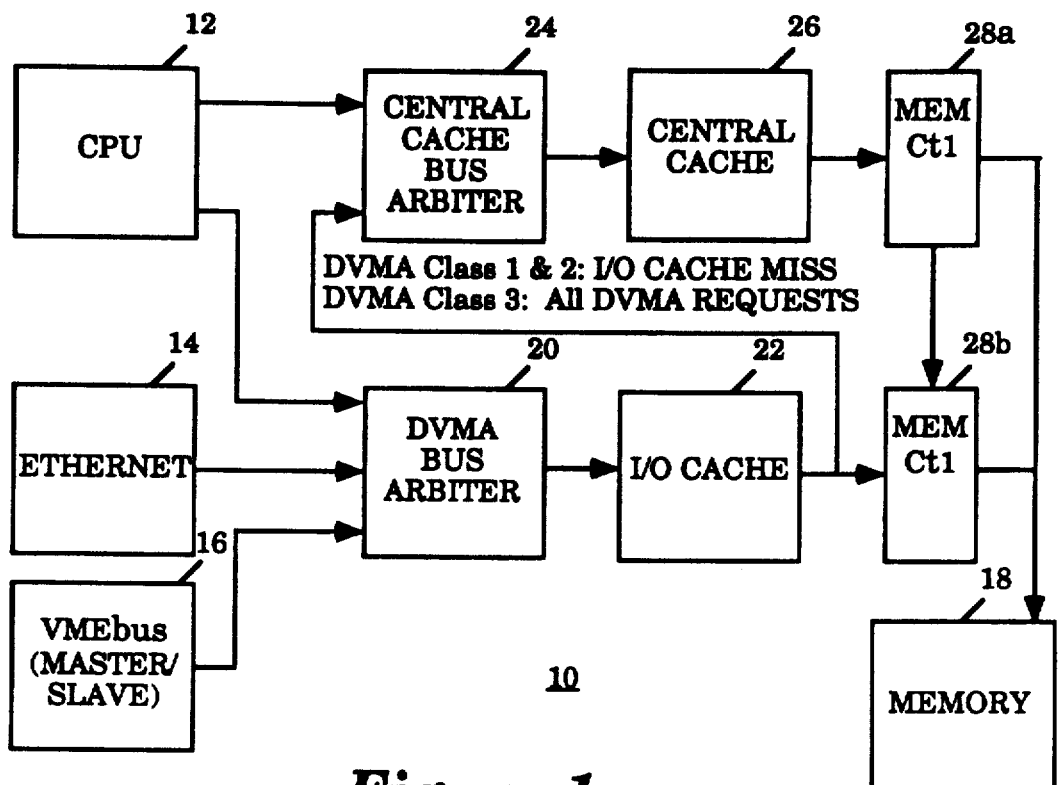
FIGS. 1a-1b are two block diagrams showing the basic system elements in a computer system with an I/O Cache.
Figure 1B:
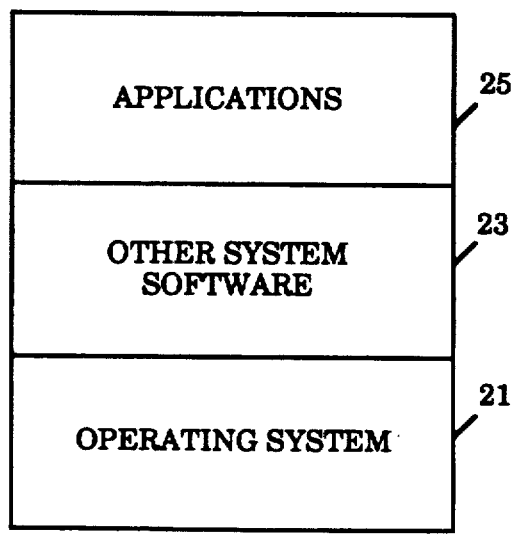

FIGS. 1a and 1b show the most fundamental elements of a cache based computer system with an I/O Cache and Consistency Controls. Within this system 10 three device interfaces, a Central Processing Unit (or CPU) 12 together with two DVMA device interfaces 14 and 16, access programs and data from a memory subsystem 18. The two DVMA device interfaces 14 and 16 shown are an Ethernet network transceiver and controller 14, and a VMEbus Slave interface 16. (In typical configurations, the CPU 12 also utilizes a VMEbus Master interface 16 to directly access devices on the VMEbus 16.) A DVMA Arbiter 20 is used to arbitrate access to the I/O Cache busses among the two DVMA device interfaces 14 and 16 and the CPU 12, while a Central Cache Bus Arbiter 24 arbitrates access to the Central Cache 26 between the CPU 12 and a DVMA request.

The I/O Cache 22 also includes the I/O Cache array (not shown) and the necessary control logic (not shown) to operate the I/O Cache Array. This may include logic to detect an I/O Cache "miss", to create a DVMA request to the Central Cache Bus Arbiter 24 to handle this miss, and to download a modified I/O Cache block, if present, into a Write Back buffer (not shown). The I/O Cache 22 may include a DVMA data path directly to main memory 18 operating in parallel with the CPU data path, together with the necessary controls to coordinate the two memory interfaces 28a and 28b.

In order to support the proper operation of the I/O Cache 22, the operating system 21 divides all DVMA or DMA I/O devices on the system into 3 classes. These classes of devices are each treated differently by the operating system, but all devices within a class are treated identically by the routines that support the I/O Cache operation.

Class 1 devices are characterized by their sequential I/O to a dynamic buffer in system memory. They are high throughput devices, such as magnetic disk and tape, and thus increased system performance can be achieved by properly cacheing their data in the I/O Cache 22. They always perform I/O via sequential DMA access to a specified buffer, and communicate with the operating system via shared memory outside the data buffer. In all cases, the data buffer used by a Class 1 device is dynamically allocated, so the operating system 21 must allocate and deallocate the buffers for each operation.

Class 2 devices are characterized by their I/O to multiple, static data buffers. This class includes networking devices, which typically use a ring buffer scheme for sending and receiving network packets. Class 2 devices do not allocate and deallocate buffers per operation. Instead, a set of statically allocated data buffers is repeatedly used to perform I/O operations. These devices must perform sequential DMA within a data buffer, but they can be accessing several data buffers simultaneously in an interleaved fashion. Class 2 devices are also high throughput devices, so it is beneficial to system performance to have their data cached in the I/O Cache 22.

Class 3 devices are characterized by either non-sequential DMA accesses to their data buffers, or throughput that is too low to gain noticeable system performance from cacheing their data in the I/O Cache 22. The operating system 21 is designed to have Class 3 devices bypass the I/O Cache 22 entirely, so their data is never cached in the I/O Cache 22. Such data may or may not be cached in the Central Cache 26 used by the CPU 12.

When DMA devices in any of the three classes employ a virtual addressing space, then these devices are called Direct Virtual Memory Access (DVMA) devices. Within the preferred embodiment, all I/O devices which are the subject of this description are DVMA devices. However, this description may be modified to include Direct Memory Access (DMA) devices either as a substitute for DVMA devices or in conjunction with DVMA devices. DMA devices differ, conceptually, from DVMA devices only in their mechanisms to address data in main memory. DMA devices access memory using real (or physical) memory addresses; DVMA devices access memory through virtual memory addresses which are mapped to real addresses. The mechanism to accomplish this mapping in the preferred embodiment system is the I/O Mapper. The concepts of the I/O Cache, 22 developed here for a system with DVMA devices, may be extended as well to a system supporting DMA devices.

Examples of Class 1 devices in the preferred embodiment of the invention are devices connected to the system through a standard system bus, the VMEbus 16. An example of a Class 2 device in the preferred embodiment is the Intel Ethernet interface 14 with supporting DVMA logic. Examples of Class 3 devices include slower speed (e.g., serial data communication) devices connected to the system through a standard system bus (VMEbus) interface 16.

In the present invention, the problem of maintaining data consistency between an I/O cache 22 and a CPU cache 26 is solved through a unique combination of hardware and software support, which is collectively called "Consistency Controls". The term "Consistency Controls" as used below will be meant to include all associated controls, I/O Cache 22, CPU Cache 26, data paths, and diagnostic and programming support necessary to implement an efficient data consistency mechanism between the CPU cache data and I/O Cache data.

Within the Consistency Controls, Class 3 DVMA device will issue requests to access data through the Central Cache 26, and Class 1 and Class 2 DVMA devices will access the Central Cache 26 only for data consistency checks. The Consistency Controls require that the CPU 12 be able to access the I/O Cache 22 to flush DVMA data from the cache at the end of DVMA transfer sequences.

Figure 2A:
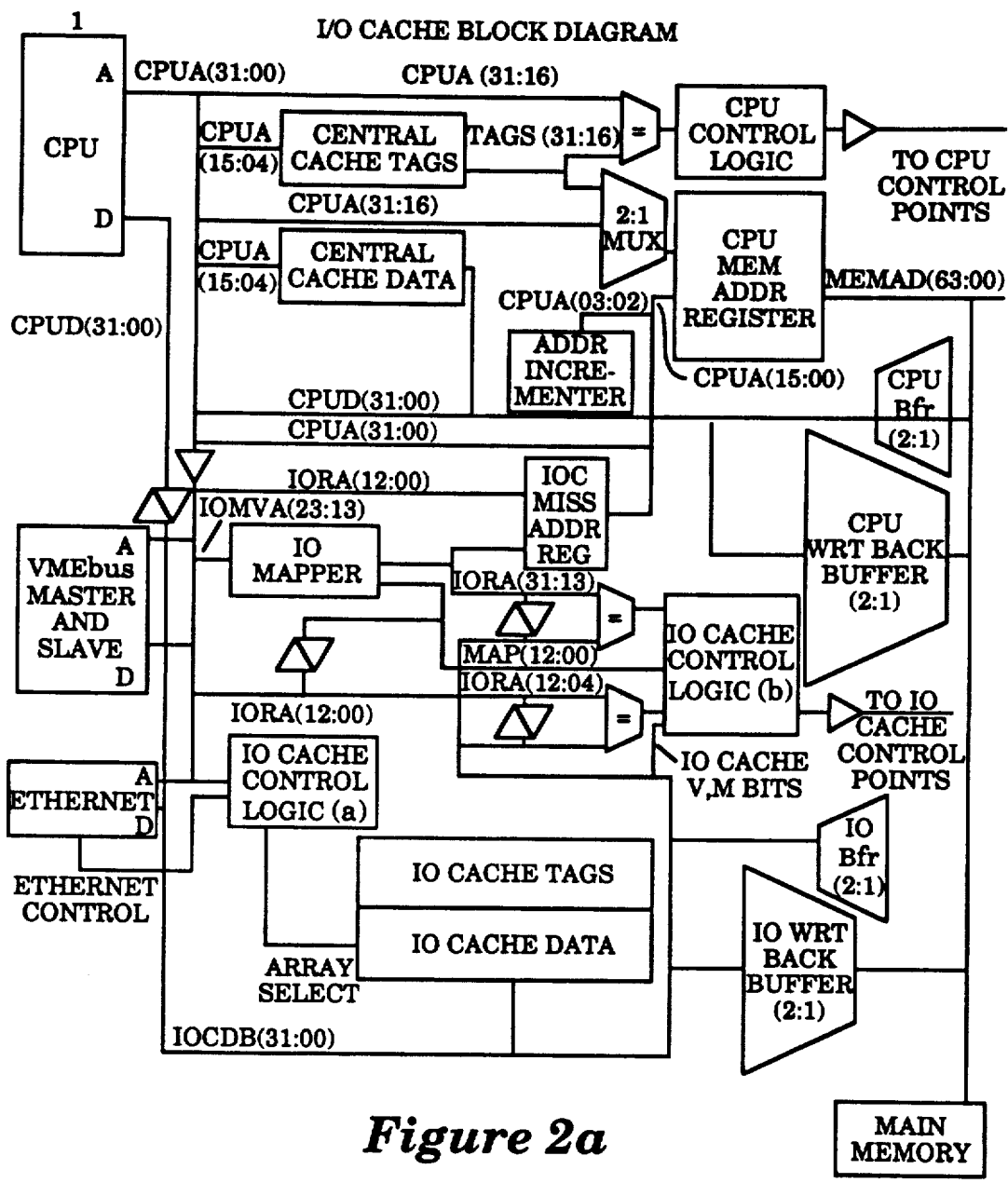
FIG. 2a is a detailed overall block diagram of major functional elements in a computer system which incorporates an I/O cache.

FIG. 2a shows in more detail the functional blocks in a computer system in which the present invention is implemented. The CPU and memory subsystem includes a microprocessor or Central Processing Unit (CPU) 12 with its address buffer and data transceiver, CPU Address and Data busses 30 and 32, the Central Cache Tag and Data Arrays 34 and 36, an Address Incrementer 38, a Central Cache Tag Address Comparator 40, a CPU Memory Address Multiplexer 42, a CPU Memory Address Register 44, CPU Control Logic 46, a CPU Input Data Buffer (labeled CPU Bfr) 48, a CPU Write Back Buffer (labeled CPU Wrt Back Buffer) 50, a CPU to DVMA Data Transceiver 33, a CPU to DVMA Address Buffer 31, a Memory Bus 72, and Main Memory 18. The I/O subsystem includes a VMEbus Master and Slave interface 16 with its address buffer and data transceiver, an Ethernet Network DVMA interface 14 with its address buffer and data transceiver, a DVMA Address and Data bus 52 and 54, an I/O Mapper 56, an I/O Cache Miss Address Register 58, I/O Cache Control Logic 60a and 60b to both address and control the I/O Cache and to control other DVMA logic, the I/O Cache Tag and Data Arrays 62 and 64, the I/O Cache Address Comparators 66a and 66b, to compare both the high order address (Page Address) and the Block identify within a page, an I/O Cache Address to Data Buffer 57a and 57b, an I/O Cache Input Data Buffer (labeled IO Bfr) 68, and an I/O Cache Write Back Buffer (labeled IO Wrt Back Buffer)

70. A number of components of the CPU and memory subsystem also play a role in DVMA operations.

Figure 2B:
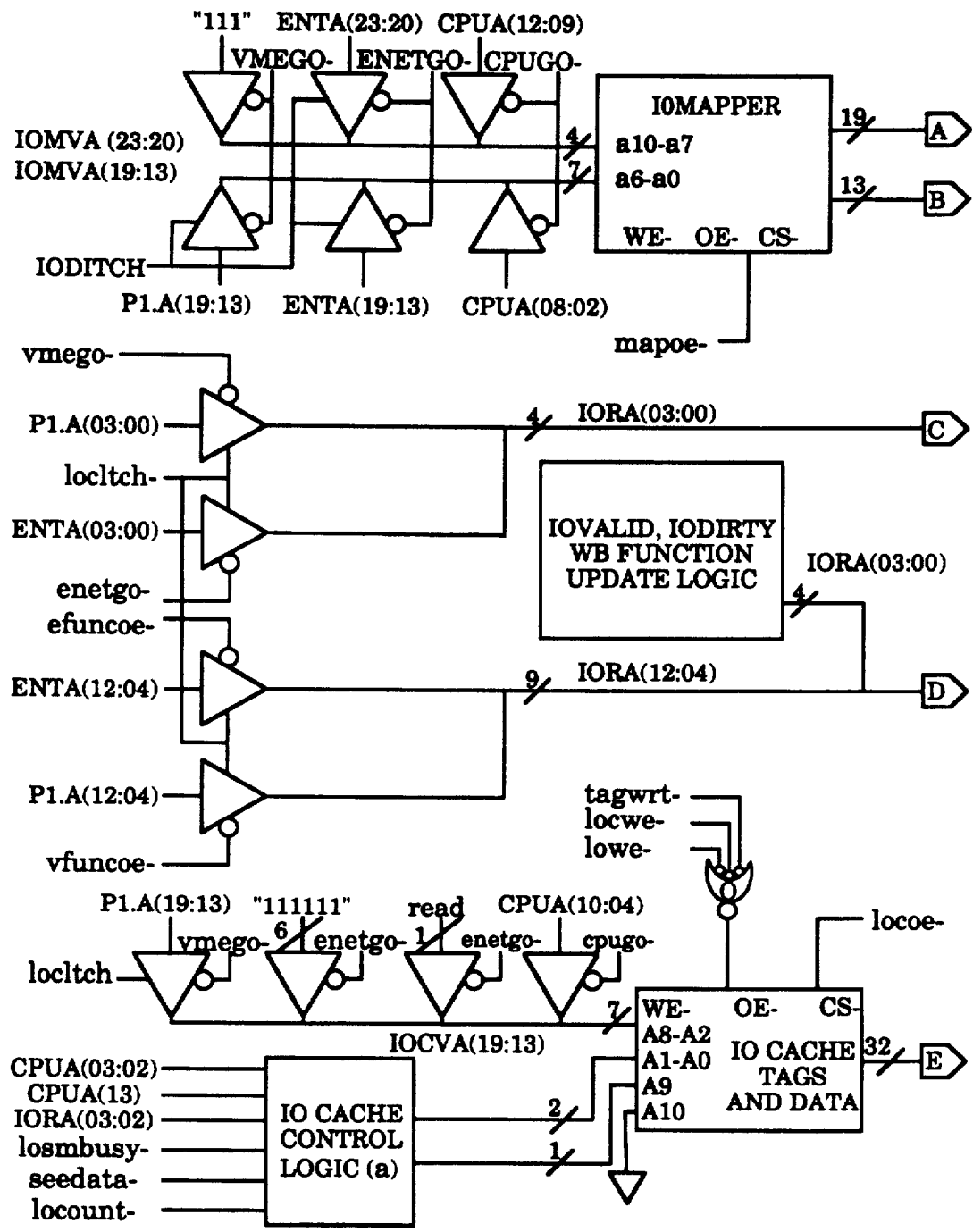
FIGS. 2b-2c provide a detailed block diagram of the major functional elements of the I/O cache itself.
Figure 2C:
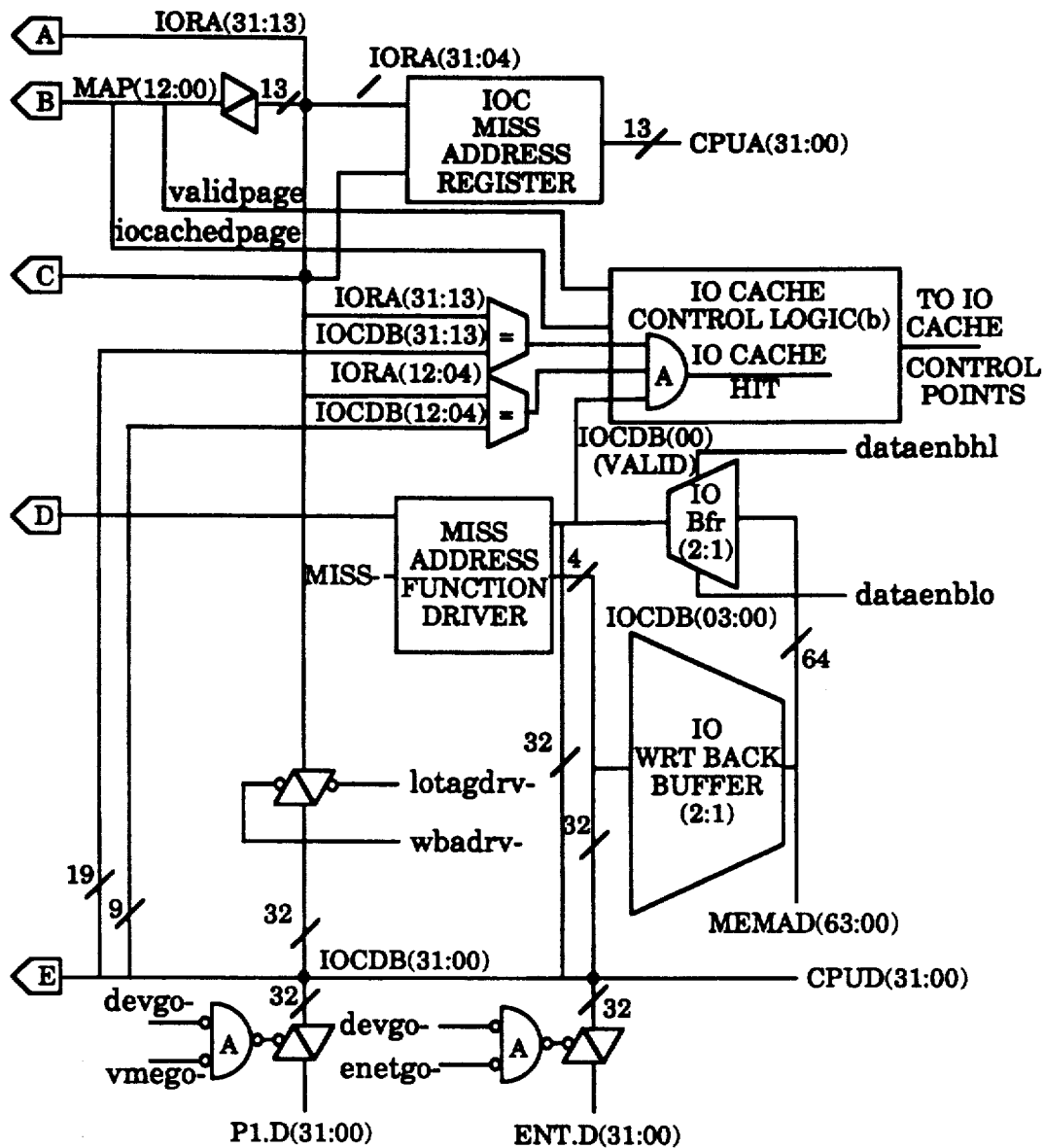

FIGS. 2b-2c show the I/O Cache subsystem in more detail. There are two added functional blocks shown in this diagram: the Miss Address Function Driver 74; and the IOvalid, IOdirty, Write Back Function Update 76 Logic. In addition, the usage of control signals set by the state machine flow charts (in later figures) is also shown.

Description of the Elements of a System with Consistency Controls: the CPU Cache Subsystem Referring back to FIG. 2a, CPU 12 issues bus cycles to address instructions and data in memory and possibly other system devices. The CPU address itself is a real address of (A) bits in size which uniquely identifies bytes of instructions or data. The CPU bus cycle may be characterized by one or more control fields to uniquely identify the bus cycle. In particular, a Read/Write indicator is required, as well as a "Type" field. This field identifies the memory address and data space as well as the access priority (i.e., "Supervisor" or "User" access priority) for the bus cycle. A CPU 12 which may be utilized in a computer system having real addressing and capable of supporting a multi-user operating system is a Motorola MC6830. Note that the Motorola MC68030 has an integral Memory Management Unit, and consequently presents real (or physical) addresses to the CPU Address Bus 30.

The CPU 12 is interconnected with other system devices and local device busses through the CPU Address and Data busses 30 and 32. The Address bus 30 is a real address bus 32 bits in width. The CPU Data bus 32 is also 32 bits in width.

The cache subsystem has meaning, insofar as the present invention is concerned, only in that DVMA data may reside in this cache. If this is the case, then DVMA Class 3 devices need the Central Cache 34 and 36 and its controls to source data, and DVMA Class 1 and Class 2 devices need the Central Cache 34 and 36 to provide data consistency for the I/O subsystem, through the application of the Consistency Controls.

Within the Central Cache 34 and 36, the Central Cache Data Array 36 is organized as an array of 2N blocks of data, each of which contains 2M bytes. The 2M bytes within each block are uniquely identified with the low order M address bits. Each of the 2N blocks is uniquely addressed as an array element by the next lowest N address bits.

The Central Cache Data Array 36 described herein is a "direct mapped" cache, or "one way set associative" cache. While this cache organization is used to illustrate the invention, it is not meant to restrict the scope of the invention, which may also be used in connection with multi-way set associative caches.

Another element required for the Central Cache 34 and 36 operation is the Central Cache Tag Array 34, which has one tag array element for each block of data in the Central Cache Data Array 36. The tag array thus contains 2**N elements, each of which has a Valid bit (V), a Modified bit (M), and a real address field (RA). The contents of the real address field, together with low order address bits used to address the cache tag and data arrays, uniquely identify the cache block within the total real address space of (A) bits. That is, the tag real address field must contain at least (A−(M+N)) bits.

Figure 3A:
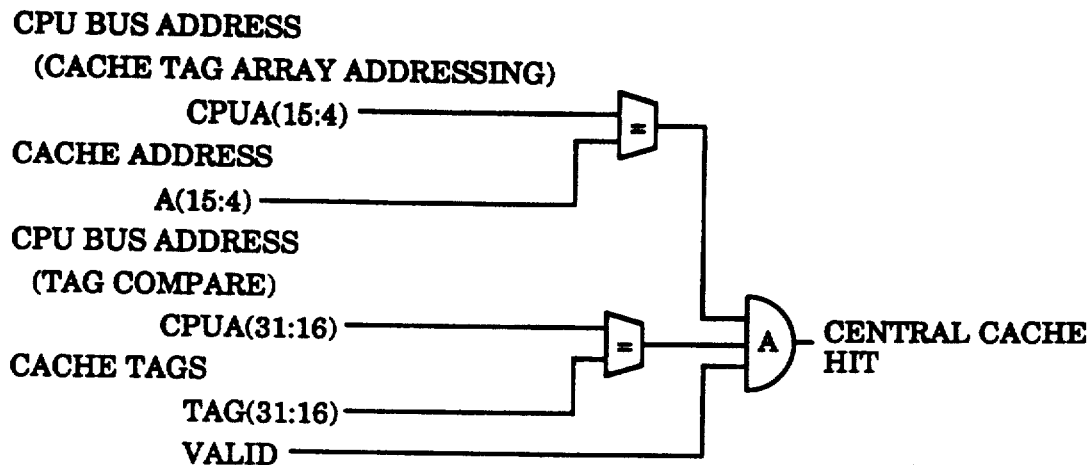
FIG. 3a is a diagram showing the cache "hit" logic for the central cache.

Central Cache "hit" logic compares the real addresses for cache accesses to the contents of the Central Cache Tag address field. Within the access address, the lowest order M bits address bytes within a block; the next lowest N bits address a block within the cache; and the remaining (A(M+N)) bits compare with the tag real address field, as part of the cache "hit" logic. (Logic for the Central Cache "hit" is shown in FIG. 3a.) Protection checking for the real address cache is not necessary, since this can be accomplished at the time of address translation from virtual to real addresses, which is done within the I/O Mapper (56 in FIGS. 2a and 2b) for DVMA cycles.

The system described herein utilizes a real address Central Cache 34 and 36. The use of a real address cache is not a requirement for the implementation of the present invention: a virtual address Central Cache, with the appropriate controls for protection checking and the detection of "alias" virtual addresses within the cache control logic, is another possible system configuration in which the present invention may be implemented. ("Alias" virtual addresses arise when two or more different virtual addresses map to the same real address.)

The Address Incrementer 38 controls the word addressing for data within the Central Cache Data Array 36. In the preferred embodiment, cache blocks are 16 bytes, or 4 words, in length. The Address Incrementer 38 controls the address generation of bits A(03:02) for the data array.

The CPU Memory Address Multiplexer 42 multiplexes the high order address bits TAGA(31:16) from the Central Cache 34 and 36 with the corresponding address bits CPUA(31:16) from the CPU Address Bus 30. The TAGA bus typically specifies a portion of a write back address, while CPUA(31:16) specifies a portion of a cache miss address. The multiplexer 42 sends the resulting address into the CPU Memory Address Register 44. This register receives its low order address bits from the CPU Address Bus 30, bits CPUA(15:00).

The CPU Memory Address Register 44 serves as the address interface to the Memory Bus 72 for all accesses to main memory 18. These accesses specifically include reading cache blocks, writing back modified cache blocks, and writing partially modified double words (selected bytes from 8 byte double words).

The CPU Control Logic 46 uses the results of the Central Cache Hit/Miss indication, as well as other information from the CPU and other system devices, to control the operation of that portion of the system related to the CPU 12.

The CPU Input Data Buffer 48 is a registered buffer for 64 bits of data from the Memory Bus 72. It multiplexes the data onto the CPU Data Bus 32 in 32 byte increments. On cache miss operations, the word miss address bit A(2) specifies which work from the CPU Input Data Buffer 48 is multiplexed onto the CPU Data Bus 32 first.

The CPU Write Back Buffer 30 is a buffering register for a full cache block which is loaded from the 32 bit CPU Data Bus 32 and drives the 64 bit Memory Bus 72. It is used to buffer modified cache blocks as well as partially modified double words to be written to memory.

The CPU to DVMA Data Transceiver 33 buffers data between the CPU Data Bus 32 and the DVMA Data Bus 54. As long as DVMA devices "hit" the I/O Cache 62 and 64, these two busses 32 and 54 and their controlling logic normally operate independently (that is, the buffers are disabled).

The CPU to DVMA Address Buffer 31 registers and buffers the address from the CPU 12 when it accesses devices which are on the DVMA Data Bus. These devices include the VMEbus Master interface 16 and the I/O Cache Tags and Data 62 and 64, for both diagnostic operations and cache flushing.

The Memory Bus 72 is a 64 bit multiplexed Address and Data bus. The CPU Memory Address Register 44 is the source for the memory address for both CPU and DVMA bus cycles, but the data buffers 48, 50, 68 and 70 for CPU and DVMA operations are independent. That is, data transfers for DVMA operations utilize the IOC Input Data Buffer 68 and IOC Write Back Buffer 70, while CPU transfers use the CPU Input data Buffer 48 and the CPU Write Back Buffer 50.

Main Memory 18 is accessed over the 64 bit Memory Bus 72. It is addressed as a 30 bit device, which is implemented with Dynamic RAM parts, and includes registers and controls for such operations as initializing physical address ranges, checking and generating ECC codes, generating DRAM Refresh, and reporting errors. These memory features and others are only necessary to the invention as they enable the implementation of a reliable main memory subsystem.

Description of the Elements of a System with Consistency Controls the CPU Cache Subsystem Operation Continuing to refer to FIG. 2a, within the present implementation, the Central Cache and memory subsystem are utilized for Consistency Controls in two possible roles. First, for Class 1 and 2 DVMA devices, the Central Cache and memory subsystem are accessed on I/O Cache "misses" to check for data consistency between the Central Cache 34 and 36 and the IO Cache 62 and 64. Second, for Class 3 DVMA devices, the Central Cache and memory subsystem can be the source (or destination) of the DVMA data.

For this latter case, the I/O Cache Miss Address Register 58 (described below) issues a physical address. This address is checked against the contents of the Central Cache Tag Array 34. The low order bits of the address from the I/O Cache Miss Address Register 58 are used to address both the Central Cache Tag and Data arrays 34 and 36. In particular, bits A(15:04) address the Tag Array 34, and bits A(15:02) address a word in the Data Array 36. The high order bits A(31:16) of the I/O Cache Miss Address Register 58 address are compared with the contents of the address field of the Tag Array 34 with the Central Cache Tag Address Comparator 40. If the compare is a match and the tag entry is legitimate, as indicated by a "Valid" bit within the Tag Array entry, then the I/O Cache Miss Address Register 58 access has resulted in a Central Cache "hit". If the I/O Cache Miss Address Register 58 issued a read operation, the contents of the Central Cache Data Array 34 addressed by A(15:02) are sent to the DVMA Data bus 54. If the I/O Cache Miss Address Register 58 issued a write operation, data from the DVMA Data bus 54 is written into the Central Cache Data Array entry addressed by A(15:02), with bytes modified as indicated by a "size" field set by the I/O Cache Miss Address Register 58. The corresponding Tag entry's "Dirty" bit is set to indicate that the cache line has been modified.

Should the address issued by the I/O Cache Miss Address Register 58 not result in a Central Cache "hit" (i.e., result in a cache "miss"), and the DVMA page is marked cacheable for the Central Cache 34 and 36, a block of data from Main Memory 18 is read through the CPU Input Data Buffer 48 and placed into the Central Cache Data Array 36. On a DVMA read miss, the miss data from the memory interface is forwarded onto the DVMA Data bus 54. If the operation is a write, incoming data from Main Memory 18 is merged with modified bytes of DVMA data from the DVMA Data bus 54. This merged data is written into the Central Cache 34 and 36, along with the rest of the cache block from memory, and the "Dirty" bit in the Central Cache Tag Array 34 is set. For any miss, as long as the DVMA page is marked cacheable for the Central Cache 34 and 36, the address of the new data is written into the address field of the Central Cache Tags 34.

Should a cache miss require data from Main Memory 18 to be written to a location in the Central Cache Data Array 36 currently occupied by a valid cache block that had been previously modified, the block is first read out of the Central Cache Data Array 36 into the CPU Write Back Buffer 50. The data is written into Main Memory 18 from the CPU Write Back Buffer 50 after the memory read required by the cache miss. If the Central Cache hit rate is high, then the Main Memory 18 traffic generated by the CPU 12 will be low, allowing high bandwidth for DVMA devices to access Main Memory 18.

For DVMA Class 1 and Class 2 devices, the Central Cache 34 and 36 is used to provide data consistency between the Central Cache 34 and 36 and the I/O Cache 62 and 64. If the I/O Cache Miss Address Register 58 indicates a read DVMA bus cycle, then data is sourced from the Central Cache 34 and 36 onto the DVMA Data bus 54 if the DVMA address "hits" the Central Cache 34 and 36. If the DVMA read address "misses" the Central Cache 34 and 36 (the typical case) then read data is sourced from Main Memory 18 through DVMA subsystem data buffers 68 and 70, as explained below.

Similarly, if the I/O Cache Miss Address Register 58 indicates a write DVMA bus cycle, then a "hit" in the Central Cache 34 and 36 causes the Central Cache entry at the "hit" address to be invalidated. A "miss" in the Central Cache 34 and 36 simply allows the DVMA operation to complete within the I/O subsystem.

Description of the Elements of a System with Consistency Controls: the I/O Cache Subsystem Continuing to refer to FIG. 2a, within the I/O subsystem, the VMEbus Master and Slave Interface 16 includes drivers and receivers for the VMEbus address and data busses together with arbiter logic, interrupt handling logic, and such other controls as are needed to implement a VMEbus Master and Slave interface 16 according to the VMEbus specification. The VMEbus Slave interface 16 supports DVMA cycles from the system bus.

Figure 4A:
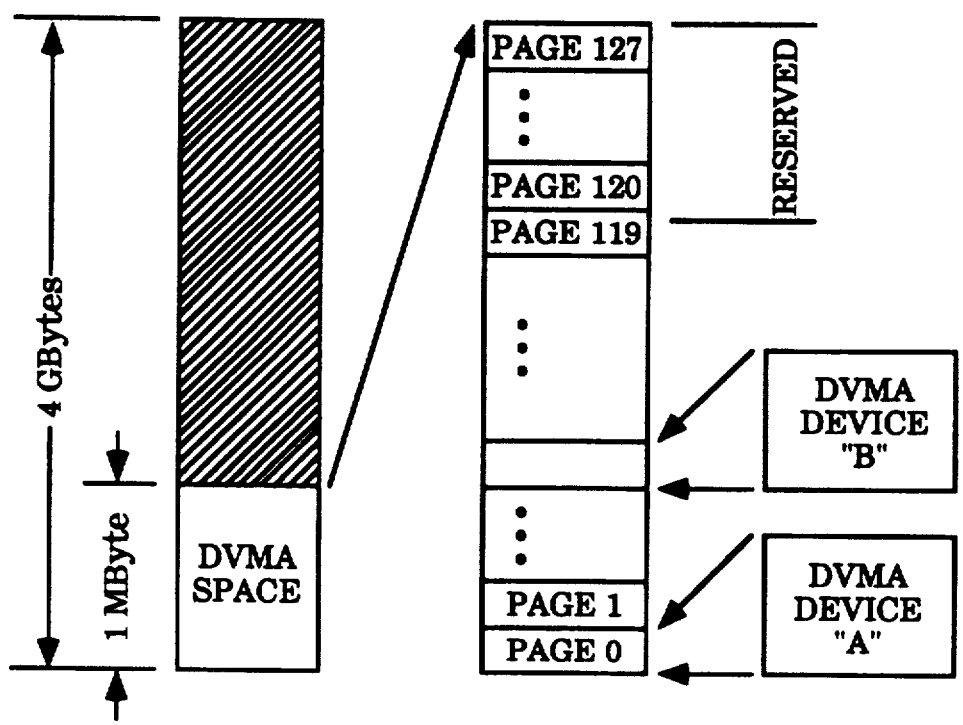
FIG. 4a is a diagram showing the DVMA address space for a typical computer system.

A particular element of this control is logic to recognize virtual VMEbus addresses within the CPU's VMEbus DVMA address space. (This DVMA virtual address space is shown in FIG. 4a). From the full 32 bit (4 gigabyte) VMEbus address space 82 (VMEbus A32 option from the VMEbus specification), or from the 24 bit (16 Megabyte) VMEbus address space (option A24 from the VMEbus specification), the lowest (P) pages are recognized as the DVMA virtual address space 84 for the system, where each page is of size (S) bytes. In the present implementation, the page size is (S=8) kilobytes, and the DVMA virtual address space 84 for VMEbus devices is (P=128) pages total. Of these, the top 8 pages are reserved.

The Ethernet Network DVMA Interface 18 includes an Ethernet control chip and supporting logic together with address and data registers and buffers to interconnect with the DVMA Address and Data busses 52 and 54.

The DVMA Address Bus 52 is a virtual address bus which interconnects the VMEbus DVMA address interface 16, the Ethernet DVMA address interface 14, and the CPU to DVMA Address Buffer 31 with the I/O Mapper 56, the block address inputs for the I/O Cache Tag and Data Arrays 62 and 64, the I/O Cache Address Comparators 66a and 66b, the I/O Cache Miss Address Register 58, the I/O Cache Address to Data Buffer, and the I/O Cache Control Logic 60a and 60b.

The DVMA Data Bus 54 interconnects the VMEbus data interface 16, the Ethernet data interface 14, and the CPU to DVMA Data Transceiver 33 with the I/O Cache Tag and Data Arrays 62 and 64, the I/O Cache Address to Data Buffer 57a and 57b, the I/O Cache Address Comparators 66a and 66b, the I/O Cache Input Data Buffer 68, the I/O Cache Write Back Buffer 70, and the I/O Cache Control Logic 60a and 60b.

The I/O Mapper 56 translates the virtual addresses from the DVMA devices into physical addresses while performing protection checking. The Mapper 56 is effectively a simple MMU. It has an entry for each page of the DVMA address space. Each entry is L bits in width and is broken into an address bit field and a status bit field. The address field provides the translation from virtual to physical page number for the virtual address supplied at the input. The status field consists of several bits which indicate, if the page is valid, what the write and access protections for the page are, and if the page is I/O Cacheable. The key status bit required is the I/O Cacheable bit. The particular content of the I/O Mapper 56 may vary considerably. In fact, an I/O system using DMA, with physically mapped devices, can still use the same principals described in this invention. An I/O Cacheable bit would, however, still be required for such a system.

The I/O Cacheable bit in the I/O Mapper 56 distinguishes those pages, and consequently those DVMA devices, which can use the I/O Cache 62 and 64 from those which can not. DVMA Class 1 and Class 2 devices are mapped as I/O Cacheable, while DVMA Class 3 devices are mapped as non-I/O Cacheable. DVMA transfers for these later devices are handled as accesses to the Central Cache 34 and 36, ignoring the I/O Cache 62 and 64.

The Miss Address Function Driver (74 in FIG. 2c) drives the low order address bits, IORA(03:00), with new updated page statistics and control bits during a page mapper update.

The I/O Miss Address Register 58 captures the physical DVMA address for bus cycles which are non-I/O Cacheable, as indicated in the I/O Mapper 56. The I/O Miss Address Register 58 also captures the physical DVMA address for DVMA cycles from Class 1 devices which "miss" the I/O Cache 62 64. The address source for low order bits within a page is the Virtual I/O Address Bus 52, while the I/O Mapper 56 sources the physical page translation.

The I/O Cache Control Logic 60a and 60b controls the arbitration of the CPU 12 and DVMA devices for use of the I/O Address and Data busses 52 and 54; the indexing of both the I/O Mapper 56 and the I/O Cache Tag and Data Arrays 62 and 64; the updates of the I/O Mapper 56 from the CPU 12; updates of the I/O Cache Tag and Data Arrays 62 and 64 from the CPU 12, from the I/O Mapper 56, and from Main Memory 18; the control of Flush commands from the CPU 12 to the I/O Cache 62 and 64; and all other controls associated with independent DVMA operation of the I/O Cache 62 and 64. This logic also interacts with the CPU Control Logic 46 on all I/O Cache misses, for cache consistency; all CPU 12 accesses to devices within the DVMA subsection; and on all DVMA accesses to non-I/O Cacheable pages, again for cache consistency. It finally provides such control related to the handling of DVMA cycles and CPU 12 access of DVMA logic which is necessary for both testability and functionality but is not explicitly enumerated in this summary description.

The I/O Cache Tag and Data Arrays 62 and 64 contain P cache tag entries and P cache data blocks. Each I/O Cache data block contains B bytes of data. Generally, the I/O Cache Data Array 64 block size is the same as the Central Cache Data Array 36 block size. This is not a requirement but does simplify the system implementation. Each of the P I/O Cache Tag Array entries records the memory address and control information for each of the P blocks of data in the I/O Cache Data Array 64 at the corresponding address. In general, the memory address in the I/O Cache Tag Array 62 may be either a physical address or a virtual address, and this virtual address again may be either from the DVMA device address space or from the operating system address space for DVMA Devices. In the present implementation, the address field of the I/O Cache Tag Array 62 contains a physical address.

Figure 4B:
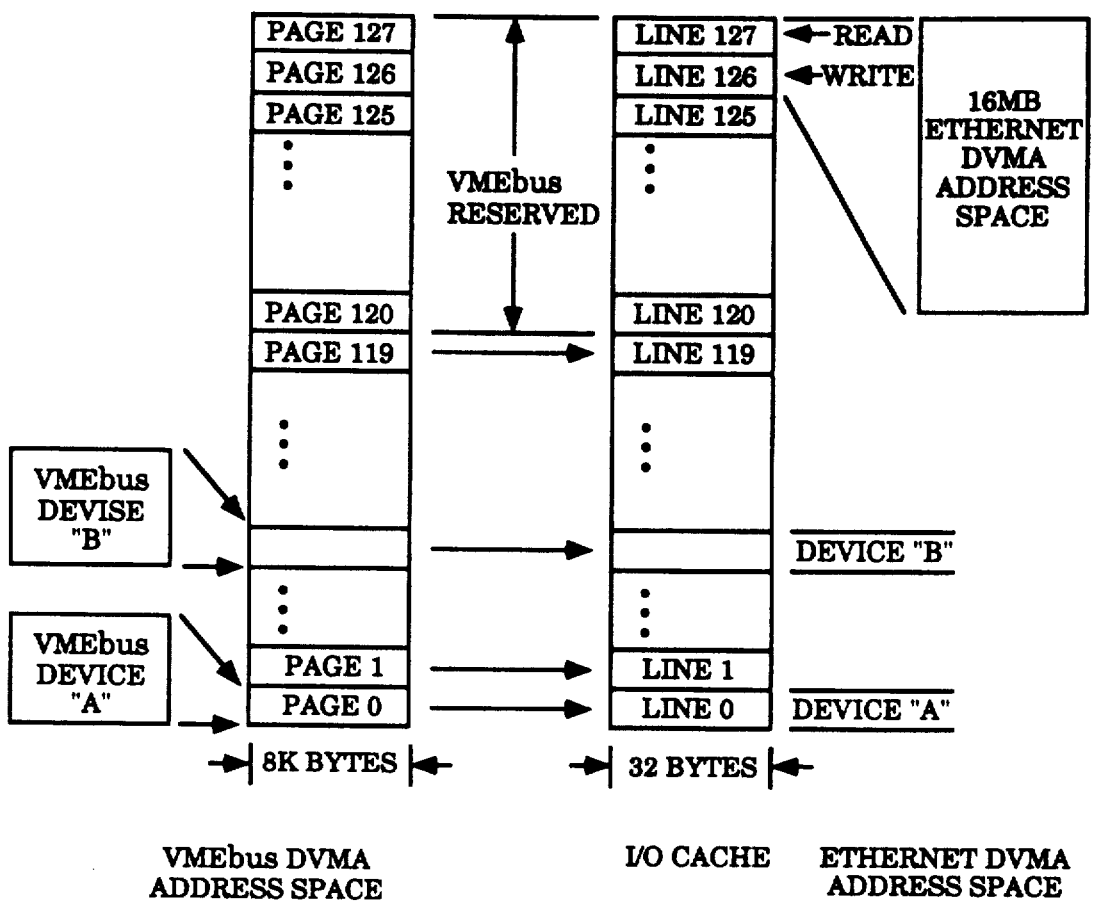
FIG. 4b is a diagram showing how the DVMA address space maps into the I/O cache for Class 1 and Class 2 devices.

How the I/O Cache Tag and Data Arrays 62 and 64 must be addressed is not a requirement for the Consistency Controls. In the present implementation, the I/O Cache Tag and Data Arrays 62 and 64 are addressed with VIOA(19:13) for VMEbus DVMA devices, which corresponds to the page index within the virtual VMEbus DVMA address space. Within this range, the top 8 pages are unused. Two of these are in turn assigned for use as Ethernet buffers: one for Ethernet read data, at A(19:13)=0×7f, and one for Ethernet write data, at A(19:13)=0×77. (The mapping of the VMEbus Address Space and the Ethernet Address Space to the I/O Cache Data Array is shown in FIG. 4b.)

In general, the Tag Array 62 must contain within its address field as many bits as are required to uniquely identify the DVMA block address. In the present implementation, the Tag Array 62 contains a physical address. This is not a requirement for the I/O Cache 62 and 64, but leads to design simplifications in the present implementation. The I/O Mapper 56 maps both the 24 bit Ethernet DVMA address space and the 20 bit VMEbus address space into the physical address space, which is 32 bits in this implementation. Therefore, the address field in the I/O Cache Tag Array 62 in this implementation contains the physical address A(31:04). In an I/O Cache Tag Array 62 access in the present implementation, the Tag Array 62 address field bits A(31:13) are compared with the physical address PIOA(31:13) from the I/O Mapper 56, while the bits A(12:04) from the address field, which identify the block within a page, are compared with the corresponding bits VIOA(12:04) in the VIOA bus. If the two comparisons described above match and the valid bit of the I/O Cache Tag Array entry is set, then an I/O Cache "hit" is indicated.

The I/O Cache Tag Array 62 may be accessed by the CPU 12 for at least two distinct operations, a diagnostic read/write operation and an I/O Cache Flush command, as part of the Consistency Controls. CPU diagnostic cycles can write data into and read data patterns from the Tag Array 62 as a P entry memory array. In the present implementation, the CPU 12 address bits A(10:04) index the Tag Array 62, both on diagnostic operations and for the Flush command.

The Flush command, which is a CPU 12 write cycle in the present implementation, results in the I/O Cache Control Logic 60a and 60b first reading the I/O Cache Tag Array entry to see if it is valid and whether it is modified. If the entry is both valid and modified, the controls download the corresponding block in the I/O Cache Data Array 64; see the Data Array description, below. If the entry is not valid, no further action is taken to the tag array. If the entry is valid, then this I/O Cache Tag Array entry is invalidated.

The I/O Cache Tag Array 62 is also updated as a part of normal DVMA cycles. If the DVMA device access "hits" the I/O Cache 62 and 64, then no update of the Tag Array 62 is required. If the DVMA device bus cycle is I/O Cacheable, has no protection violation (as indicated through the I/O Mapper 56) and "misses" the I/O Cache 62 and 64, then at the conclusion of the DVMA bus cycle, the entry in the Tag Array 62 will be written with the new DVMA physical block address, the valid bit set to true, and the modified bit set if the DVMA device is executing a write cycle. On DVMA write cycles which "miss" the I/O Cache 62 and 64, if the old Tag Array entry is marked valid and modified, then the physical block address from the Tag Array 62, A(31:04) in the present implementation, is written into the I/O Cache Miss Address Register 58. This address will be loaded into the CPU Memory Address Register 44 to provide the write back address for the modified I/O Cache block.

The I/O Cache Data Array 64 has P blocks, corresponding to the P Tag Array entries. Like the Tag Array 62, it may be accessed by the CPU 12 for at least two distinct operations, a diagnostic read/write operation and an I/O Cache Flush command, as part of the Consistency Controls. CPU diagnostic cycles can write data into and read data patterns from the Data Array 64 as a P entry memory array of B bytes. In the present implementation, the CPU 12 address bits A(10:04) index the block of the Data Array 64, while A(3:2) identify a word within the block.

The I/O Cache Address Comparators 66a and 66b provide the address comparison to determine if an I/O Cache "hit" has occurred. In the present implementation, the block identification bits from the Tag Array, A(12:04), must match the DVMA address in VIOA(12:04), and the physical page address from the Tag Array, A(31:13), must match the I/O Mapper 56 physical address, PIOA(31:13).

The I/O Cache Address to Data Buffer 57a and 57b provides the path to access the output of the I/O Mapper 56 onto the I/O Data Bus 54. This buffer has two uses. First, this path is used to update the physical address field in the I/O Cache Tag Array 62. Second, the path is used for diagnostic testing of the I/O Mapper 56 by the CPU12.

The IOvalid, IOdirty, Write Back Function Update Logic (76 in FIG. 2b) drives the low order address bits, IORA(03:00), with new updated tag values on I/O Cache updates. It also examines these bits during an I/O cache tag check to see if a write back of a modified I/O Cache block is required.

The I/O Cache Input Data Buffer 68 provides the data path to the I/O Cache data Array 64 for DVMA data returned from Main Memory 18 on DVMA read cycles which "miss" the I/O Cache 62 and 64. On such operations, the "miss" data for the DVMA device is simultaneously bypassed to the DVMA device while it is written into the I/O Cache Data Array 64. The buffer is also used as the data path for returning data from Main Memory 18 to those Class 3 DVMA devices which are mapped to non-I/O Cacheable pages.

The I/O Cache Write Back Buffer 70 provides the data path for writing modified data from the I/O Cache Data Array 64 back into Main Memory 18. It also buffers the write back address from the I/O Cache Tag Array 62.

Description of the Elements of a System with Consistency Controls: the I/O Cache Subsystem Operation Summary Continuing to refer to FIG. 2a, the operation of the components of the I/O Cache subsystem for a DVMA transfer from a VMEbus device is summarized below. The cycle begins with the VMEbus DVMA interface 16 decoding the VMEbus address as being in the DVMA address space. Since VMEbus is the default device on the I/O address and data busses 52 and 54, the I/O Cache Tags 62 and I/O Cache Mapper 56 are accessed immediately, in parallel with the synchronizing of the VMEbus Address Strobe. The VMEbus address within the DVMA address space, VMEA(19:01), maps directly into the I/O address bus VIOA(19:01); VIOA(00) is set from VMEbus byte controls.

The VMEbus device uses the virtual DVMA page address VIOA(19:13) to index the I/O Cache Tag Array 62. The address field of the I/O Cache Tag Array 62 contains a physical address. The I/O Cache Address Comparator 66a and 66b compares the lower order block address bits contained in the address field of the tag entry selected, A(12:04), against the untranslated bits of the DVMA block address generated by the VMEbus device, in VIOA(12:04).

Figure 3B:
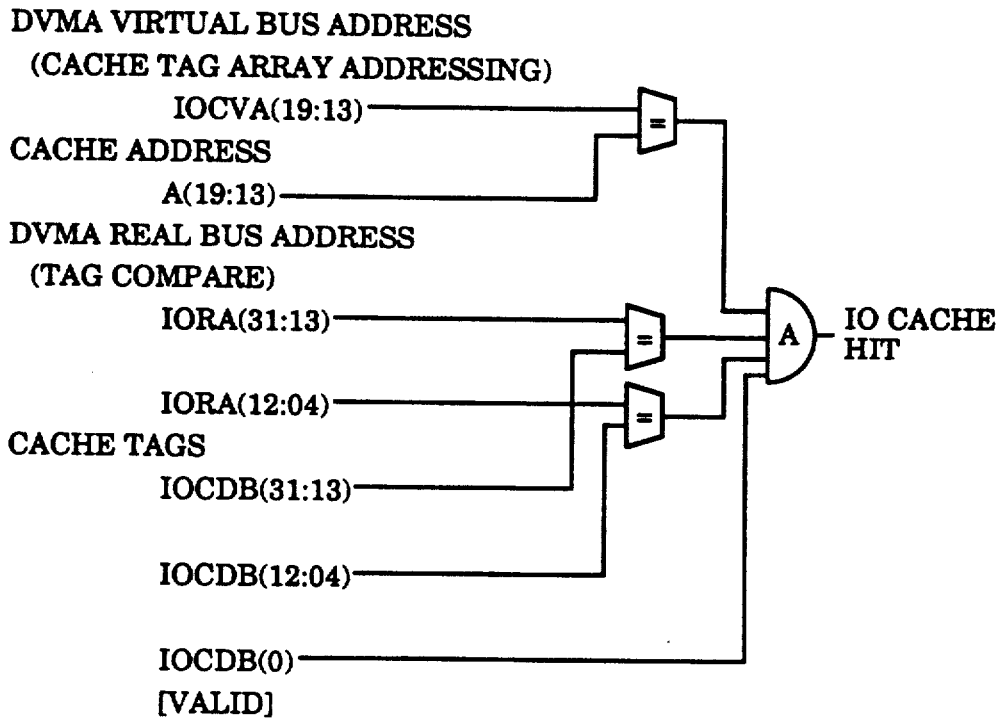
FIG. 3b is a diagram showing the cache "hit" logic for the I/O cache.

In parallel with the I/O Cache Tag Array 62 access, the I/O Mapper 56 is also accessed. The Mapper 56 output, RIOA(31:13) is then compared with the Tag Array 62 high order address field, TAGA(31:13) for the second tag address comparison. If the two comparisons described above match and the valid bit of the I/O Cache Tag Array entry is set, then an I/O Cache "hit" is indicated. (The I/O Cache hit logic shown in FIG. 3b.) If the VMEbus device is doing a read cycle, data from the I/O Cache Data Array entry is sent to the VMEbus device. If a write cycle is occurring, data from the VMEbus device is written into the I/O Cache Data Array entry. An I/O Cache "miss" results, in general, if either of the two address comparisons does not match, if the valid bit in the Tag Array 62 is not set, or if the Dirty bit is not set on a bus cycle in which the DVMA device is doing a write cycle.

During a Class 1 or Class 2 DVMA read cycle which "misses" the I/O Cache 62 and 64, a block of data is written into the Data Cache 64. Depending on the results of the cache consistency check with the Central Cache 34 and 36, this data may originate from either of two sources: Main Memory 18, or the Central Cache 34 and 36.

The consistency check against the Central Cache 34 and 36 begins with the I/O Cache Control Logic 60a and 60b initiating a read request to the Central Cache 34 and 36 through the I/O Cache Miss Address Register 58. If an address match is found in the Central Cache 34 and 36, then a block of data from the Central Cache 34 and 36 is downloaded to the DVMA Data Bus 54 through the CPU to DVMA Data Transceiver 33. If no address match is found for the consistency check, then data is transferred from Main Memory 18 through the I/O Cache Data Input Buffer 68 to the DVMA Data Bus 54. In both cases, the requested data is bypassed to the DVMA device while the block is written into the I/O Cache Data Array 64. The I/O Cache Tag Array entry is updated with the new DVMA address and marked valid.

Subsequent sequential reads by the DVMA device will result in an I/O Cache "hit" until all the data of the block addressed in the initial "miss" cycle has been read by the DVMA device. It is only the initial "miss" cycle that requires arbitration with the CPU 12 and access to the Central Cache 34 and 36 for a consistency check.

During a Class 1 or Class 2 DVMA write cycle which "misses" the I/O Cache 62 and 64, in the present implementation the I/O Cache Tag Array entry addressed by the DVMA device is first examined. If this block is valid and modified, then the address from the Tag Array 62 and the block of data from the data array are downloaded into the I/O cache write back buffer 70; if the block is not modified, no download is necessary. The DVMA data from the current write cycle can now be written into the I/O Cache Data Array 64, and the I/O Cache Tag Array entry can be updated with the new physical address and marked valid and modified. A DVMA write back cycle, with the address and data provided through the I/O Cache Write Back Buffer 70, returns the former modified data from the I/O Cache 62 and 64 to Main Memory 18. The completion of the DVMA write cycle does not depend on completing the Write Back cycle to Main Memory 18.

To check for Central Cache 34 and 36 data consistency, the Central Cache Tag Array 34 is accessed with the physical address of the DVMA write cycle. If an address match is found, then the corresponding block in the Central Cache 34 and 36 is invalidated. If no match is found, then control is returned to the I/O Cache Controls 60a and 60b.

Subsequent sequential writes by the DVMA device may, in certain implementations, result in an I/O Cache "hit" until the entire block has been filled by the DVMA device. Then the next sequential write will result in an I/O Cache "miss". Assuming that the address accesses the same I/O Cache entry, the data in the I/O Cache block is dirty and cannot be overwritten by new data. This "miss" causes an I/O Cache Write Back cycle to be initiated by filling the Write Back Buffer 70 before new data is written into the I/O Cache 62 and 64. It is only the initial "miss" cycle that requires arbitration with the CPU 12 and access to the Central Cache 34 and 36 for a consistency check.

On both read and write cycles which miss the cache and have no protection violation, the I/O Cache Control Logic 60a and 60b updates the I/O Cache Tag Array entry addressed by the DVMA device. The real address field bits A(31:13) are updated with the translated physical address, from RIOA(31:13), transmitted onto the I/O Cache Data Bus 54 through the I/O Cache Address to Data Buffer 57. The block address bits A(12:04) are updated from VIOA(12:04), similarly transmitted onto the I/O Cache Data Bus 54 through the I/O Cache Address to Data Buffer 57.

Any data that might potentially remain in the I/O Cache Data Array 64 at the end of a transfer sequence by a DVMA device must be removed. This data can be removed from the I/O Cache 62 and 64 through the means of an I/O Cache Flush command. The system software specifies the I/O Cache array index that is to be flushed from the I/O Cache 62 and 64. The CPU 12 can indicate this command by several means, but the one used in this implementation is a write to a particular address range. This range is uniquely decoded as a Flush command by the I/O Cache Control Logic 60a and 60b, and A(10:04) from the Flush command then specifies the block to be flushed. When the I/O Cache Control Logic 60a and 60b executes a Flush command, the I/O Cache Tag Array 62 is accessed, indexed from A(10:04). If the tag entry's Valid bit is set, the entry is flushed. The Valid bit is cleared, and if the Modified tag bit is set, then the data is read out of the I/O Cache Data Array 64 into the I/O Cache Write Back Buffer 70 in preparation for a background write back cycle to Main Memory 18.

Hardware and Software Requirements for Consistency Controls

Continuing to refer to FIG. 2a, the following are the hardware and system software requirements for implementing Consistency Controls.

The Consistency Controls in the present embodiment use an efficient combination of hardware and operating system commands to ensure that the CPU 12 and each DVMA Class 1, 2, and 3 device accesses consistent data. There are three distinct problems in maintaining data consistency. First, if the Central Cache 34 and 36 is a write back cache, then the Consistency Controls must ensure that all CPU 12 writes into the cache are seen by DVMA devices reading data from the cache-memory subsystem.

Second, regardless of whether the Central Cache 34 and 36 is a write through or write back (copy back) cache, the Consistency Controls must ensure that all addresses for blocks within the Central Cache 34 and 36 which are overwritten by DVMA devices writing new data into the cache-memory subsystem, are marked as invalid or "stale" addresses within the Central Cache 34 and 36.

Third, since the I/O Cache 64 acts as a temporary storage buffer for DVMA data in transit between the cache-memory subsystem and DVMA devices, the Consistency Controls must ensure that data and controls within the I/O Cache 64 are properly reset at the conclusion of each transfer sequence by a DVMA device. In particular, for DVMA devices writing into the cache-memory subsystem, any data in the I/O Cache 64 at the end of the transfer sequence must be flushed into memory. For DVMA devices reading from the cache-memory subsystem, any valid read data left in the I/O Cache 64 at the end of the transfer sequence must be invalidated.

Within the Consistency Controls, Class 3 DVMA devices resolve these three requirements by bypassing the I/O Cache 64 on all DVMA accesses and, instead, accessing data directly from the Central Cache 36 (or Main Memory 18, if the DVMA data is non-cacheable for the Central Cache 36).

For Class 1 and Class 2 DVMA devices, the first and second requirements are efficiently solved within the Consistency Controls by the use of hardware controls which "snoop" into the Central Cache 36 upon every I/O Cache 64 "miss" on a block of data. When a DMVA read request "misses" the I/O Cache 64, the block "miss" address is checked against the Central Cache 36. If a matching address is found, this block of data is copied from the Central Cache 36 into the I/O Cache 64 while bypassing the required "miss" data to the DVMA device. Similarly, when a DVMA write request "misses" the I/O Cache 64, the block "miss" address is also checked against the Central Cache 36. If a matching address is found, this block of data is invalidated within the Central Cache 36. This data consistency mechanism is efficient in that the frequency with which Class 1 and 2 DVMA devices interfere with the CPU 12 for access to the CPU cache 36 is dramatically reduced: only I/O Cache 64 miss cycles require Central Cache 36 snooping.

The third requirement for Class 1 and Class 2 DVMA devices is solved by hardware and software interaction, through the use of a Flush I/O Cache command issued by the CPU 12 at the conclusion of a DVMA device transfer sequence. In summary, the Flush command addresses a block within the I/O Cache 64. If this block is valid and modified, then the contents of the block are written back into memory. If the block is valid, it is marked invalid. If the block is invalid, no action is taken. If the mapping of the DVMA device address space into the I/O Cache Arrays 64 is properly specified, then the number of I/O Cache blocks to be flushed at the conclusion of a DVMA device transfer sequence will be minimal. The proper action of the Flush command depends on operating system conventions and constraints, which are outlined in the following sections.

In response to the partial data consistency supported by the hardware, the operating system must logically divide the physical address space of the system into segments of size M bytes, where M is the larger of the cache line size of the CPU cache 36 and the cache line size of the I/O cache 64. For each of these resulting segments, the operating system must abide by the following rules to prevent data inconsistencies from occurring:

1. each segment must be identified internally at any given instant of time as being owned either by the CPU cache or the I/O cache 64.

2. segments owned by the CPU cache 36 can be accessed freely by the CPU 12, but the operating system must insure that the I/O cache 64 contains no valid data for that segment and that no I/O cacheable DMA accesses occur to the segment while it is owned by the CPU cache 36.

3. segments owned by the I/O cache 64 can be freely accessed by I/O cacheable DMA devices, but the operating system must insure that no CPU 12 accesses to the segment occur while it is owned by the I/O cache 64.

Note that because of the hardware support for partial data consistency, the operating system isn't required to insure that the CPU cache 36 contains no data from a segment owned by the I/O cache 64. On the contrary, instances of data from segments owned by the I/O Cache 64 may appear valid in the CPU cache 36. The Operating System is only required to avoid accessing that data while the segment is owned by the I/O Cache 64. Eliminating the requirement to actually invalidate the data in the CPU cache 36 when ownership of a segment is transferred to the I/O Cache 64 tremendously increases the performance benefits of the I/O cache 36, and is one of the key concepts of the invention.

The operating system fulfills the above requirements by following these guidelines:

1. All logical I/O buffers used by the operating system that are to be marked I/O cacheable at any time must be aligned such that the lowest base 2 log(M) bits of their physical address all equal 0, and sized such that the buffer is an integral multiple of M bytes in length. This insures that any I/O cacheable buffer begins and ends on cache line boundaries in both the CPU cache 36 and the I/O cache 64, and thus can be easily assigned as wholly owned by either the CPU cache 36 or the I/O cache 64.

For Class 1 devices, this is accomplished by always allocating full pages of physical memory for logical I/O buffers. Full pages of physical memory always satisfy the above criteria.

For Class 2 devices, this is accomplished by explicitly padding the logical I/O buffers with unused bytes until they meet the above criteria. When the static buffers for Class 2 devices are allocated at system startup, enough additional memory is allocated so that the buffers can be aligned and sized according to the constraints.

For Class 3 devices, none of the logical I/O buffers are ever marked I/O cacheable, so the above criteria does not apply.

2. When ownership of a segment is transferred from the CPU cache 36 to the I/O cache 64, the operating system must inhibit subsequent CPU 12 accesses to that segment.

For Class 1 and 2 devices, this is accomplished by using the internal state of the operating system to mark the logical I/O buffer that segment is contained in as owned by the I/O device, and preventing any processes from generating CPU 12 accesses to that segment. This also requires that the ownership of all segments contained in a given logical I/O buffer remain consistent at all times; the entire buffer is either owned by the CPU cache 36 or by the I/O cache 64.

For Class 3 devices, ownership is never transferred to the I/O cache 64, so this criteria does not apply.

3. Whenever ownership of a segment is transferred from the I/O cache 64 to the CPU cache 36, the operating system must flush any data for that segment out of the I/O cache 64, and inhibit subsequent I/O cacheable accesses to that segment.

For Class 1 devices, this is accomplished by the operating system module that deallocates the logical I/O buffers after completion of the operation. This module uses the address and size of the logical I/O buffer to calculate which cache lines of the I/O cache 64 may contain data from segments within the logical I/O buffer, and executes a flush operation to each of those lines. Next the module invalidates the I/O cacheable mapping to the buffer, so no subsequent accesses to any segment in the buffer will be I/O cacheable. If the logical I/O buffer is later used for DMA from a Class 1 device, it is reallocated and remapped I/O Cacheable by the operating system before ownership of the buffer is transferred back to the I/O Cache 64.

For Class 2 devices, this is accomplished by the device driver module for the specific device. The device driver code that processes the completion of an I/O operation must perform a flush operation to the appropriate I/O cache line, based on the direction of the completed operation. The device driver must then change its internal state to mark the logical I/O buffer as owned by the CPU cache 36. It is up to the device driver to control the device and prevent it from making further accesses to any segments in the logical I/O buffer.

For Class 3 devices, ownership of segments in the logical I/O buffers is never transferred to the I/O cache 64, so the above criteria does not apply.

Therefore, as DVMA data is either read from memory 18 or written to memory 18, for all Class 1, Class 2, and Class 3 DVMA devices, hardware controls ensure that the DVMA data is kept consistent with data in the Central Cache 34 and 36. For Class 1 and 2 DVMA devices, on DVMA read cycles, the DVMA data will be sourced from the Central Cache 34 and 36 if a matching address is found. On DVMA write cycles, a stale block of data found in the Central Cache 34 and 36 at the same physical address as a block of data being written by a DVMA device will be invalidated. For Class 3 DVMA devices, the Central Cache 34 and 36 will be searched on both read and write cycles.

At the conclusion of a DVMA transfer sequence, in order to ensure that all data from the I/O Cache 62 and 64 is properly flushed from the I/O Cache 62 and 64 into Main Memory 18 (on a DVMA write) or that the DVMA address is invalidated from the I/O Cache 62 and 64 (on a DVMA read), the operating system will issue Flush commands to the I/O Cache 62 and 64. The operating system must recognize when a DVMA transfer sequence has terminated as a requirement for issuance of a Flush command.

The flush command specifies the I/O Cache array index to be flushed through the CPU address bits A(10:04). For VMEbus DVMA devices, this address corresponds to the device page address, A(19:13), in the VMEbus DVMA address space. For Ethernet, a Flush command to A(10:04)=0×7F flushes the Ethernet read buffer, and a flush to A(10:04)=0×77 flushes the Ethernet write buffer. If the I/O Cache block specified is valid and modified, an I/O Cache Write Back cycle is initiated for the block. If the block specified is valid, then the valid bit is cleared. If the block specified is invalid, no action is taken.

Since the CPU 12, at the conclusion of a DVMA transfer sequence, the I/O Cache Control 60a first issue an I/O Cache Flush command in order to guarantee that all DVMA data is properly transferred to or from Main Memory 18, then it is the responsibility of the operating system to ensure that no CPU reference to DVMA data be made prior to the conclusion of the DVMA transfer sequence and prior to the issuance of the I/O Cache Flush command. CPU and I/O Cache controls 46, 60a and 60b ensure that a Flush write back cycle to memory will complete prior to a subsequent reference by the CPU 12 to the DVMA data.

I/O Cache Flowchart Operation

Figure 5:
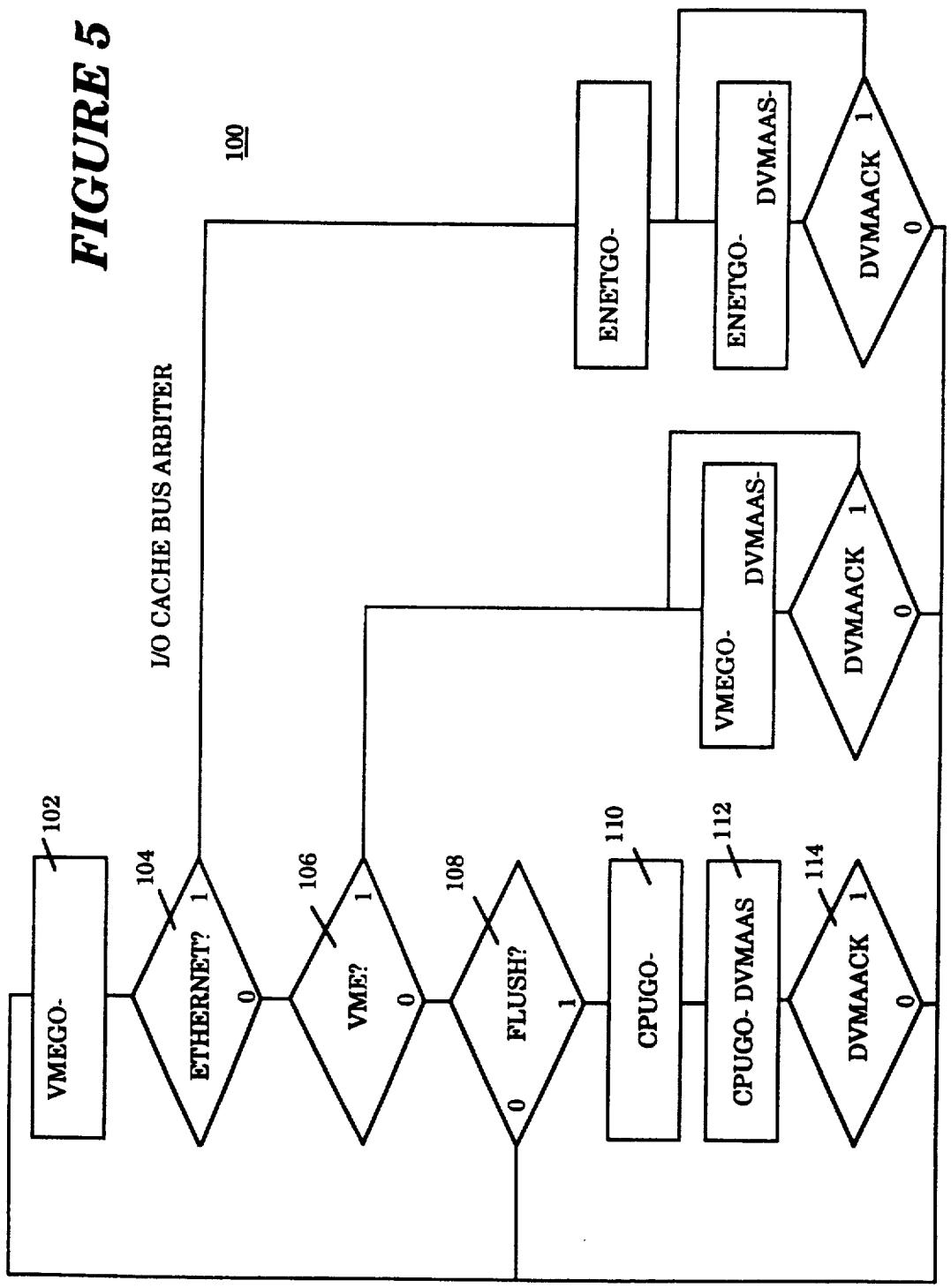
FIG. 5 is a flow diagram of a cache bus arbiter for the I/O cache which describes the arbitration of the I/O buses in response to three request types: an Ethernet request, a VME request, and a Flush I/O Cache request from the CPU.

Referring now to FIG. 5 which describes the arbitration of I/O Cache busses for fundamental I/O Cache bus cycles. There are three functional I/O Cache request types: a VMEbus request, an Ethernet request, and a CPU Flush request. In addition, the CPU can also issue at least three other requests which may require the use of I/O Cache busses, which are not fundamental to the functional operation of the I/O Cache. All of these requests behave, in terms of the arbiter operation, like the CPU Flush request which is shown.

The first additional CPU request is a VMEbus Master cycle, in which the CPU requires the use of I/O Cache data and address paths to access the VMEbus Master interface. The second CPU request is an I/O Cache Diagnostic cycle, in which the CPU tests the I/O Cache by writing and reading the I/O Cache tag and data arrays. This testing is not normally done as a part of the I/O Cache functional operation, but rather for diagnosis only. The third CPU request is an I/O Mapper update, in which the CPU reads and writes the contents of the I/O Mapper.

The following convention is used in the flowcharts to describe and reference certain control signals. If the signal is an "active high" signal, then its name has no "−" suffix; if it is an "active low" signal, then its name has a "−" suffix. If an active low signal is true, then it will be at a physical value of "0". When active low signals are tested in a decision block, a "0" decision block output corresponds to the condition that the active low signal is TRUE, and a "1" decision block output corresponds to the condition that the active low signal is false.

An Ethernet DVMA request from the Ethernet DVMA interface is indicated by the ETHERNET signal. A VMEbus DVMA request is indicated by the VME signal. This signal would result from an active VMEbus address and data strobe, together with a VMEbus address which is decoded as being within the DVMA address space recognized by the system. A CPU bus cycle which is decoded as an I/O Cache flush request is indicated by the FLUSH signal.

When the arbiter grants bus ownership to each of these three functional I/O Cache requests, the arbiter asserts a "GO" signal, which helps to control both the flow of control logic and also the enabling of various device data paths. The CPUGO-signal, blocks 110 and 112, is asserted for the Flush operation; the VMEGO-signal, blocks 102 and 116, for the VMEbus DVMA cycle; and the ENETGO-signal, blocks 120 and 122, for the Ethernet DVMA cycle. The arbiter also asserts a DVMA address strobe, labeled DVMAAS-, blocks 112, 116 and 122, to indicate a valid DVMA cycle to I/O cache state machines. Both the "GO" and DVMAAS- signals are deasserted at the conclusion of a bus cycle by a DVMA acknowledge signal, labeled DVMAACK-, blocks 114, 118 and 124 whose assertion is described in further detail later in FIG. 9.

Figure 6:
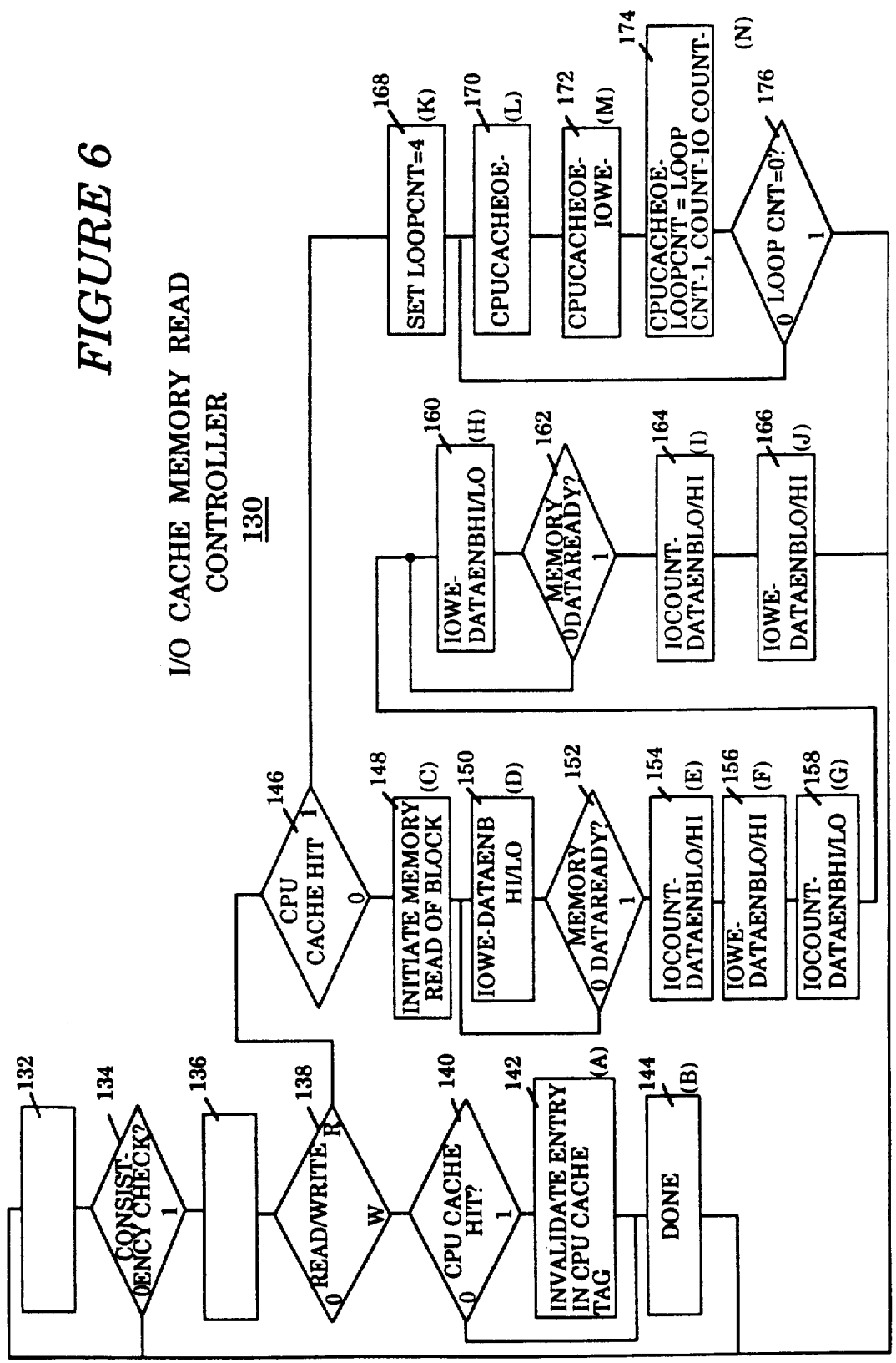
FIG. 6 is a flow diagram of a cache memory read controller for the I/O cache which describes the control of the memory read operation for I/O cacheable pages. Also shown in this diagram is how the data flow would be altered if hardware data consistency controls have been implemented.

Referring now to FIG. 6 which describes the memory read operation for an I/O cacheable DVMA cycle. The test condition CONSISTENCYCHECK, block 134, is both a control timing point and a logic signal. With the consistency checking in the preferred embodiment, this signal will be asserted, following an I/O cache miss detection and establishing that the DVMA page is I/O cacheable, when the DVMA consistency request gains CPU bus mastership and has the DVMA address asserted on the CPU address bus.

The control for systems with hardware Central cache data consistency checking is as follows. First, the test for READIWRITE, block 138, depends on whether the DVMA cycle is a read or write bus cycle. For both cases, a test is made to see if the DVMA address matches a tag address in the Central Cache, as indicated by the signal CPUCACHEHIT, blocks 140 and 146. For a write cycle which misses the Central cache, there is no action taken (state B). If a write cycle hits the Central Cache, then the Central Cache tags are invalidated (state A), block 142.

For a read cycle which misses the Central cache, a read request to main memory is initiated (state C), block 148. The I/O Cache Data Array will be continuously written (state D), block 150, until the first transfer of valid data is returned from main memory, as indicated by the control signal MEMORYDATAREADY, block 152. This signal is set in response to a Data Ack 0 and a Data Ack 1 signal from main memory. The DATA-ENBHI and DATAENBLO control signals, blocks 150, 154–160, 164–166, enable, respectively, the high and low words of the IO Input Buffer. The IOWE-control signal, blocks 156, 166, sets the I/O Cache array write enable input. Since the memory bus is two 32 bit words in width, and the I/O cache array is one word, two update cycles are required for each memory bus transfer. These are shown as the states D, F, H, and J, blocks 150, 156, 160 and 166. In states E, G, and I, blocks 154, 158 and 164, the I/O Cache Data Array counter is incremented by one word, as indicated with the control signal IOCOUNT-, blocks 154, 158 and 164.

For a read cycle which hits the Central Cache, a line of data is read from the Central Cache and passed to the I/O Cache for updating. This is shown in the loop control states K, L, M, and N, blocks 168–174. The Central cache array output enable is indicated by the signal CPUCACHEOE-, blocks 170–174.

Figure 7:
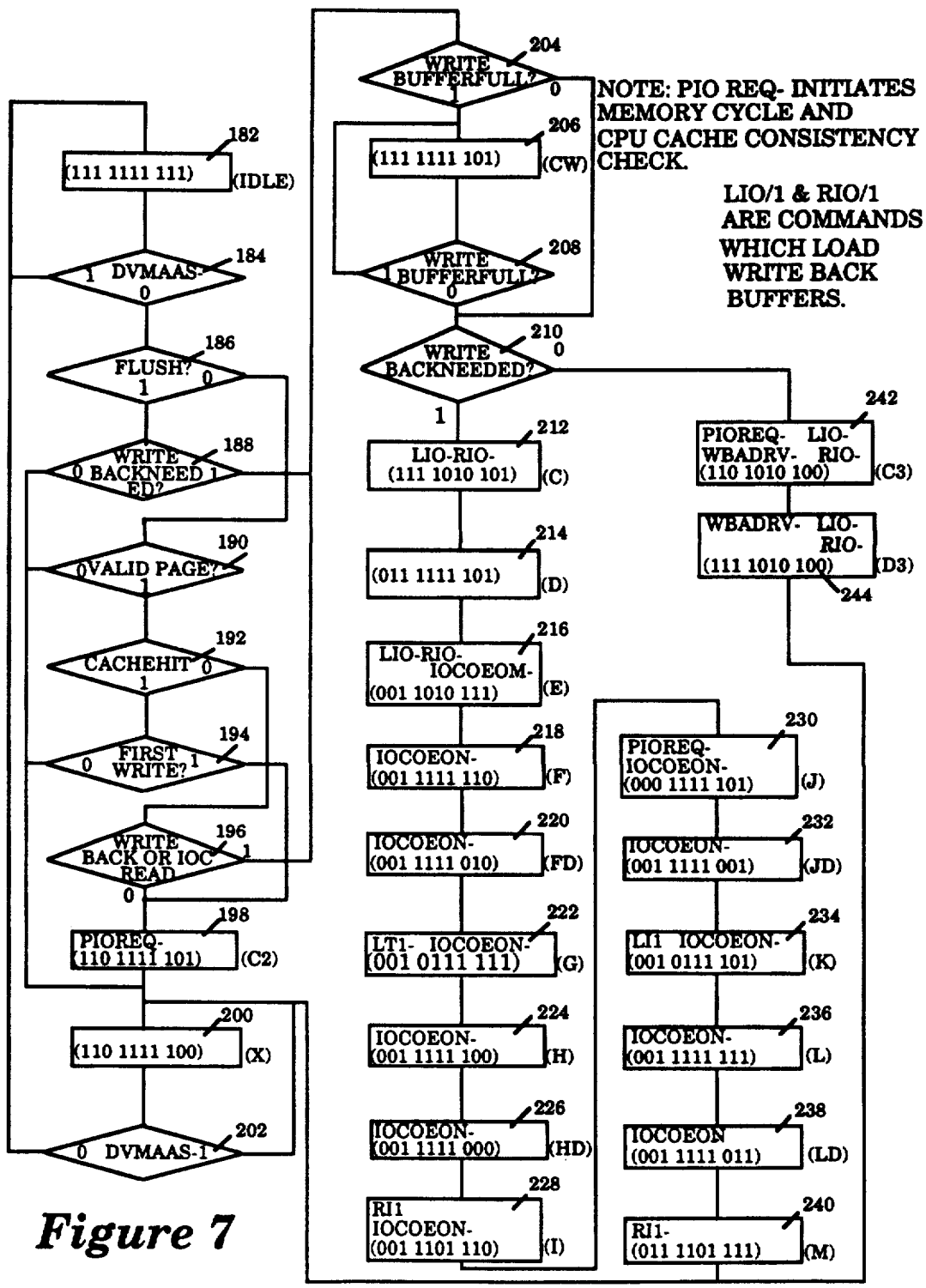
FIG. 7 is a flow diagram of a write back controller for the I/O cache which describes the control to download data into I/O Cache Write Back buffers when required.

Referring now to FIG. 7 which describes the I/O Cache write back control. To initiate this state machine, first DVMAAS-, blocks 184 and 202, must be asserted. A test is first made to see whether this cycle is a FLUSH, block 186, from the CPU. If so, a test is made for WRITEBACKNEEDED, block 188. This control signal will be set if the I/O Cache Tag Array indicates that the addressed block is both valid and modified (or "dirty"). If so, a test is made for WRITEBUFFER-FULL, block 204. This control signal will be set if the I/O Cache Write Back Buffer still has valid contents from a previous I/O Cache cycle requiring data to be written back to main memory. If the buffer is full, the state machine loops in state CW until the Write Back buffer is available.

Now the current I/O cache block can be downloaded into the Write Back buffer. First, in state C, block 212, the address for the block is loaded into the I/O Write Back Buffer from the data transceivers between the IORA bus and the IOCDB bus. The data had been captured in the transceivers at the start of the cycle. (See also the description for FIG. 10, below.) The Write Back Buffer buffers both the write back address as well as the block of data. The control signal IOCOEON-, blocks 216–238, indicates to the state machine in FIG. 8 that the I/O cache output enable is to be set active to read data onto the IOCDB data bus; the actual enable signal, IOCOE-, is set in FIG. 8. The control signals LI0-, RI0-, LI1-, and RI1, blocks 212, 216, 228, 234, 240–244, control the selection of the word buffers within the I/O Cache Write Back buffer for both the data and the address. In state J, block 230, a signal PIOREQ-, block 240, is asserted to indicate to the system memory controller that a write back cycle to main memory must be initiated. When all data is loaded, in state M, block 240, the state machine control goes to state X, block 200, where it waits until the controls complete this I/O Cache bus cycle.

If a FLUSH request has no WRITEBACKNEEDED- active, blocks 186 and 188 then the state machine branches to state X, block 200, directly. If there is no FLUSH request, a test is made for VALIDPAGE, block 190. This control signal is set if the DVMA page in the I/O Mapper is marked as valid; this signal is output by the I/O Mapper. If the page is invalid, control is transferred to state X, block 200. If the page is valid, then a test is made for an I/O Cache hit, block 192, indicated by the control signal CACHEHIT. This signal is set by the hit logic for the I/O cache.

If there is an I/O cache hit, then a test is made for FIRSTWRITE, block 194. This control signal is set if the DVMA cycle is a write cycle but the I/O Cache Tag Array entry is marked as not modified (not "dirty"). If this cycle is a first write cycle, then the Central cache must be checked for cache consistency, as required for support of the present invention. The request for a cache consistency check is made through the PIOREQ- control signal, block 198. If this DVMA cycle is not a first write cycle, then control branches to state X, block 200 to wait for the completion of the cycle.

If the DVMA cycle misses the I/O cache, as indicated by a deasserted CACHEHIT, block 192, then a test is made for the signal WRITEBACKORIO-CREAD, block 196. This signal is set if either the current I/O Cache Tag Array entry is valid and modified (indicating write back is required) or if the DVMA bus cycle is a read cycle to the I/O Cache. This is established by checking the I/O Mapper to see if the DVMA cycle is I/O cacheable. If WRITEBACKORIO-CREAD, block 196, is not active, then the state machine transitions to state C2, block 198 where PIOREQ- will be asserted on a read bus cycle to initiate the memory read cycle as well as a Central Cache consistency check.

If WRITEBACKORIOCREAD is active, then the state machine again tests for a WRITEBUFFERFULL condition, block 204. On a DVMA read cycle, this test ensures data consistency among DVMA bus cycles by guaranteeing that a FIFO ordering is observed in processing DVMA requests: the previous write back cycle must be completed before the read miss cycle to main memory is initiated. When the WRITEBUFFERFULL condition is cleared, block 208, then a further test of WRITEBACKNEEDED, block 210, differentiates DVMA read miss cycles from cycles requiring a write back. If WRITEBACKNEEDED is inactive, then the DVMA address is loaded into the IOC Miss Address Register by enabling the address through the signal WBADRV-, blocks 242–244. The signal PIOREQ-, block 242, is asserted to initiate a block read memory bus cycle and a Central Cache consistency test.

On a DVMA write cycle which misses the I/O Cache, the control signal WRITEBACKORIO-CREAD, block 196, will be deasserted. Control will fall through to state C2, block 198, which will initiate a consistency test for the read miss address in the Central Cache through PIOREQ-.

Figure 8B:
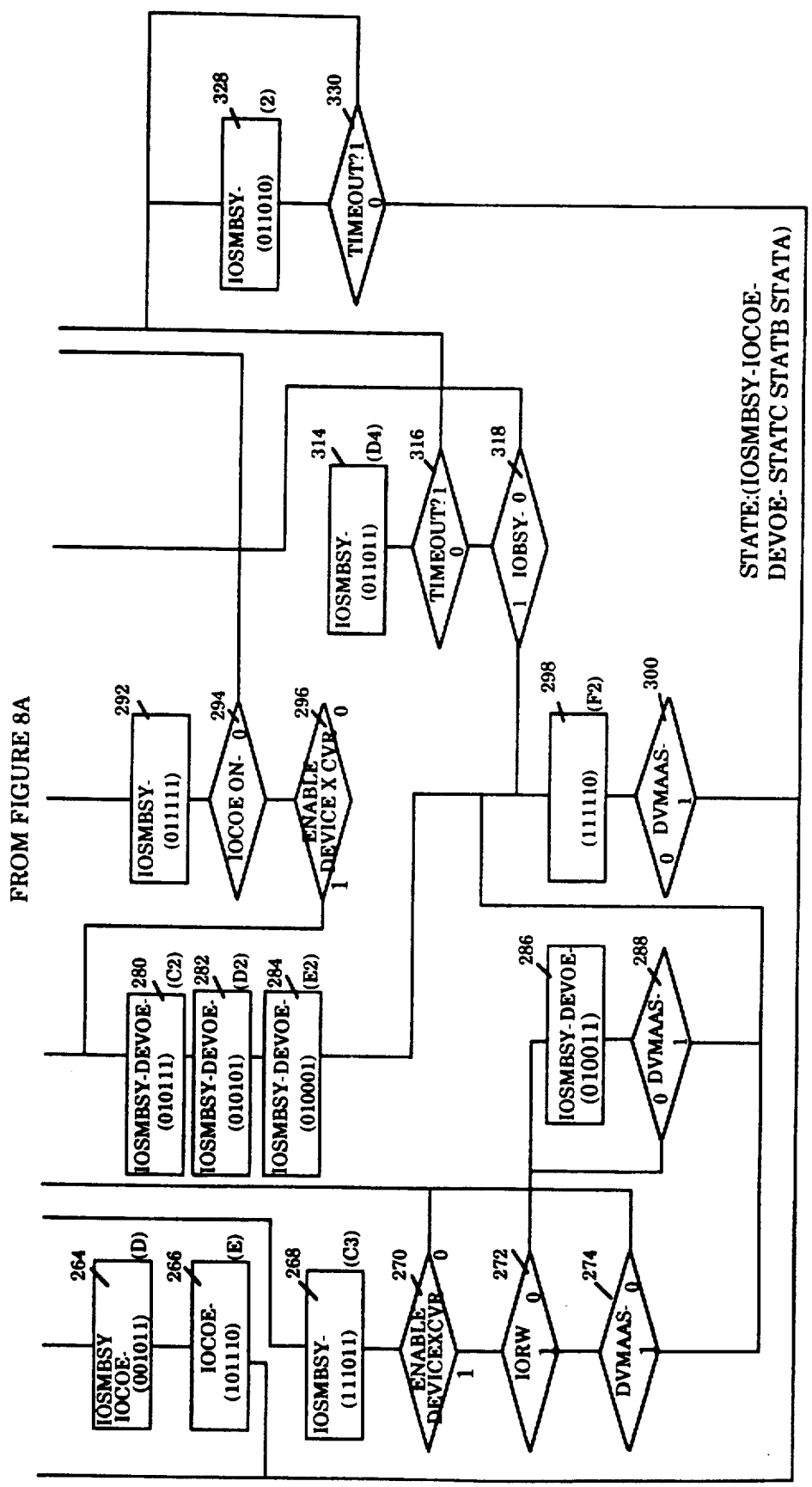

Referring now to FIGS. 8a and 8b, the basic controls for the state machines and the data bus are established. In the state IDLE, block 252, the I/O array output enable, IOCOE-, block 252, is set active. Since the default address for the I/O array is the tag array, and the default device priority is the VMEbus (FIG. 5), the I/O Tag Array entry addressed by the VMEbus is the default bus content for the IOCDB bus.

If FLSH-, block 256, is active, the state machine transitions to state C4, block 302. The TIMEOUT signal, block 304, tests for a memory bus time out. If it occurs, state Z, block 328, holds until the timeout signal, block 304, is deasserted. If TIMEOUT, block 304, is inactive, then IOCOEON-, block 306, is tested. This signal is set in FIG. 7. If active, it indicates that data must be downloaded into the I/O Cache Write Back buffer. State C4B, block 320, sets the output enable signal IOCOE-, block 320, to the I/O Cache array and holds this active until the download is complete. When the download is complete, the signal ENABLEDEVICEXCVR, block 308, tests whether the data bus transceivers for the device selected by the arbiter (FIG. 5) are active. These transceivers will be activated when the I/O Cache tag check is complete (if required) and the downloading of write back data is complete (if required). When ENABLEDEVICEXCVR, block 308, is active for the Flush cycle, block 310, the control passes immediately from state C4 to state F2, block 298, where the state machine waits for the conclusion of the cycle.

If FLSH-, block 256, is not active, the control signal CACHEHIT, block 258, is tested to see if an I/O Cache hit condition is detected. If not, then IOCACHEDPAGE, block 276, is tested. This signal from the I/O Mapper determines whether the DVMA page is I/O cacheable. If the page is cacheable, the signal IORW, block 290, is tested. IORW is active on DVMA read cycles and inactive on DVMA write cycles. For DVMA read cycles to cacheable pages which miss the I/O cache, control passes to state C4, block 302. When TIMEOUT, block 304, and IOCOEON-, block 306, are inactive, ENABLEDEVICEXCVR, block 308, is tested. When the DVMA device (Ethernet or VMEbus) is enabled, the control signal IOBSY-, block 312, is tested. This signal is set by the main memory control logic and indicates that an I/O Cache bus cycle to main memory is active. It is reset at the conclusion of the memory bus cycle. The signal is tested twice, blocks 312 and 318, first, before the state D4, block 314, and second, after state D4, block 314. The first test is to establish whether the I/O Cache bus cycle to main memory is active yet; when it is, state control passes to state C4, block 302. The second test establishes whether the memory bus cycle is complete; if so, control passes to state F2, block 298, awaiting the conclusion of the I/O Cache cycle.

I/O cacheable write DVMA requests which miss the I/O cache pass to state C2B, block 292. From here, the control signal IOCOEON-, block 294, set in FIG. 7, determines whether there is valid and modified data in the I/O cache entry which must be downloaded. If so, control passes to state C4B, block 320, until the download is complete. When complete, the signal ENABLEDEVICEXCVR, block 308, is tested to see if the DVMA device can drive the IOCDB bus. If so, the control signal DEVOE-, blocks 280-284, is set active in states C2, D2, and E2, blocks 280-284. This signal is gated with the device (VMEGO- and ENETGO-) to enable data onto the IOCDB bus. (The I/O cache write enable is controlled in FIG. 9.)

For DVMA read cycles which hit the I/O cache, control passes to state C, block 262. In states C, D, and E, blocks 262-266, the signal IOCOE-, blocks 262-266, is asserted, which enables the I/O Cache Data Array onto the IOCDB. For DVMA write cycles, a test is made for the IODIRTY signal, block 278, to determine whether the current I/O cache entry is marked as valid and modified. If it is not marked as modified, then control passes to state C2B, block 272, where the operation is treated as an I/O cache write miss. If IODIRTY, block 278, is active, then states C2, D2, and E2, blocks 280-284, drive DEVOE-, blocks 280-284, to enable the DVMA device data onto the IOCDB bus.

For DVMA requests for which IOCACHEDPAGE, block 276, is not active, control passes from IDLE, block 252, to state C3, block 268. Read cycles remain in state C3, block 268, until the cycle completes. Write cycles remain in state D3, block 286, with DEVOE-, block 286, active and the DVMA device driving the IOCDB bus, until the cycle completes.

Figure 9:
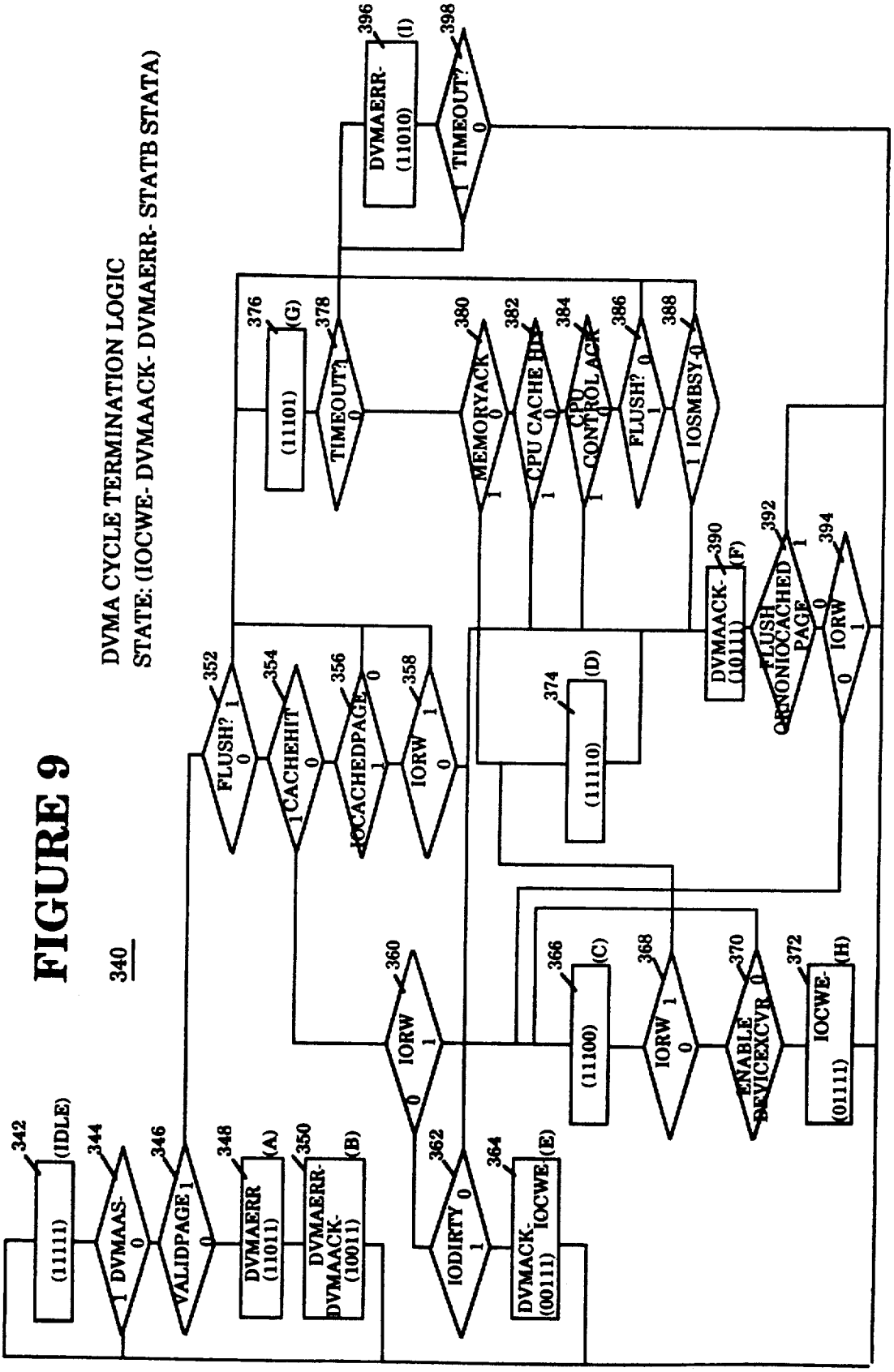
FIG. 9 is a flow diagram of DVMA cycle termination logic for the I/O cache which describes I/O Cache state machine control signals used to conclude a DVMA cycle to the I/O Cache.

Referring now to FIG. 9 which describes the controls for cycle termination. From the IDLE state, block 342, a test is made for VALIDPAGE, block 346. This control signal is set from I/O Mapper outputs. It is active only if the I/O Mapper indicates that the DVMA page translation is valid; for write DVMA bus cycles, the page also must indicate that the DVMA device has write permission. If VALIDPAGE, block 346, is inactive, an error condition is signaled DVMAERR, blocks 348-350, and the cycle is completed (asserting DVMAACK-, block 350).

For FLUSH requests with VALIDPAGE, block 346, active, control passes to state G, block 376. From state G, block 376, in general, tests are made for memory responses. For the Flush operation, these responses have no meaning, except for the test for IOSMBSY-, block 388. When this signal, set in FIG. 8, is inactive, control passes to state F, block 390. Here DVMAACK-, block 390, is asserted to conclude the arbiter state machine, FIG. 5. The control signal FLUSHORNONIOCACHEDPAGE, block 392, will be active for the Flush operation and for non-I/O cacheable DVMA cycles. This signal resets the state machine for Flush commands.

If FLUSH, block 352, is inactive, CACHEHIT, block 354, is tested to see if an I/O cache hit condition is detected. If a cache hit is detected, then IORW, block 360, is tested. For I/O cache read hits (IORW active), control passes to state C, block 360, and then to states D and F, blocks 374 and 390, where DVMAACK-, block 390, is asserted. For I/O cache write hits, (IORW, block 360, inactive), the IODIRTY signal, block 362, is tested to see if the current I/O cache entry is marked as modified (dirty). If not, control passes to state F, block 390, where DVMAACK-, block 390, is asserted. If IODIRTY, block 364, is active, then control passes to state E, block 364, where both DVMAACK- and IOCWE-, block 364, are asserted. IOCWE-, block 364, is the write enable signal to update the I/O Cache Data Array.

If FLUSH, block 352, is inactive and CACHEHIT, block 354, is inactive, then IOCACHEDPAGE, block 356, is tested. If the DVMA page is not I/O cacheable, then control passes to state G, block 376. If it is I/O cacheable, then IORW, block 358, is tested. For cacheable read cycles, control also passes to state G, block 376, in state G, block 376, in general, tests are made for memory responses. A TIMEOUT, block 378, response terminates the cycle with an error, DVMAERR-, block 396. A MEMORYACK, block 380, would be signaled for all DVMA read cycles which go to memory. It is set on the first data strobe signal. CPUCACHEHIT, block 382, is asserted for non-I/O cacheable cycles which "hit" the Central Cache and when a read consistency check for I/O cacheable data "hits" the Central Cache. CPUCONTROLACK, block 384, is asserted for non-I/O cacheable writes. When any of these conditions is true, control passes to state F, block 390, where DVMAACK-, block 390, is asserted. From state F, block 390, for cacheable write cycles, control passes to state C; for other cycles, control passes to IDLE. From state C, block 366, cacheable write cycles update the I/O Cache Data Array in state H, block 372, by asserting IOCWE-, block 372.

Figure 10:
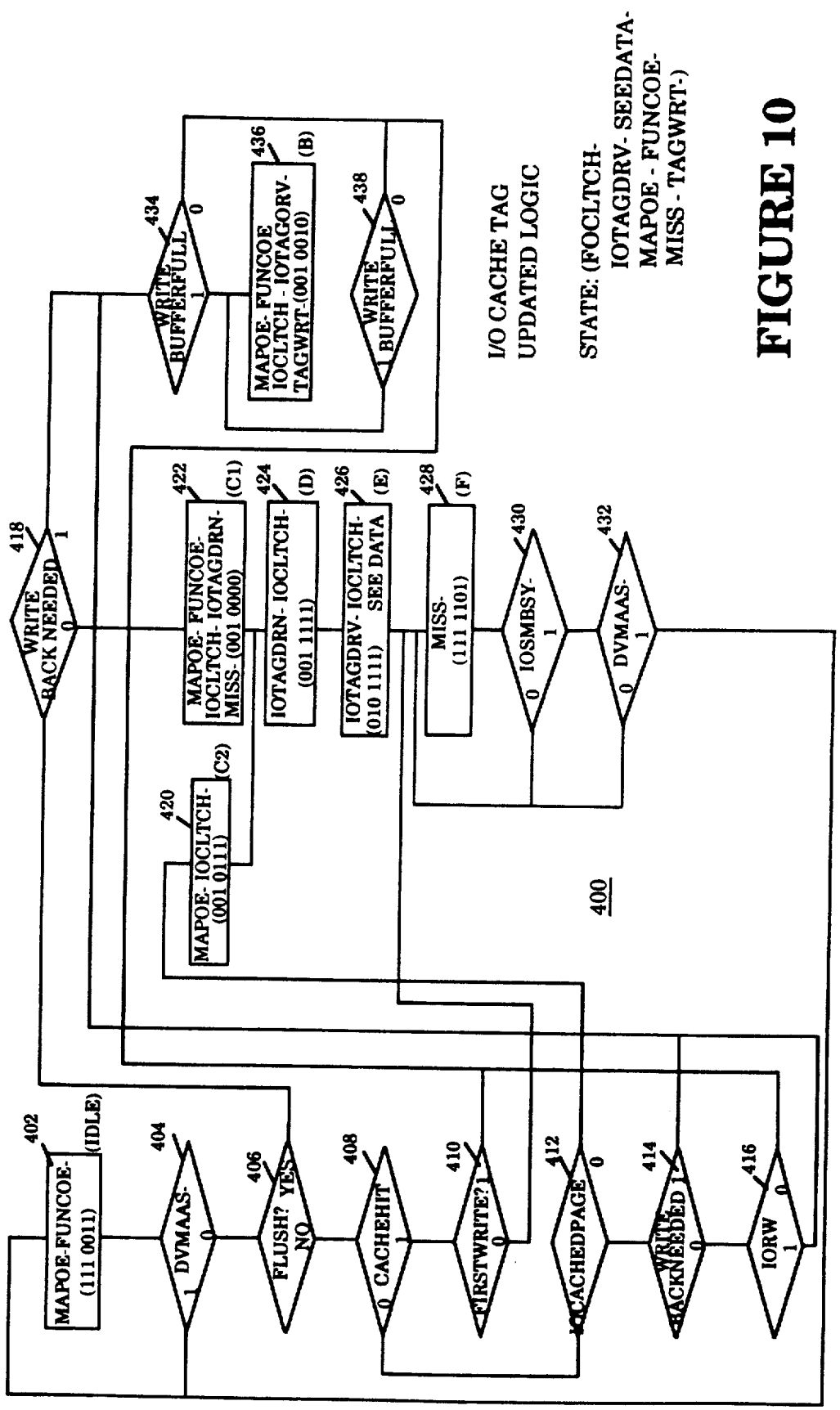
FIG. 10 is a flow diagram of tag update logic for the I/O cache which describes the controls for updating tags in the I/O Cache.

Referring now to FIG. 10 which describes the state machine to control the I/O cache tag update. In the IDLE state, block 402, two enable control signals are asserted, MAPOE- and FUNCOE-, block 402. MAPOE-, block 402, sets the output enable for the I/O Mapper, (as shown in FIG. 2b). FUNCOE-, block 402, combines with the selected I/O device (the CPU, VMEbus, or Ethernet) to enable a virtual address onto the IORA bus. ENETGO- and FUNCOE- create EFUNCOE-, and VMEGO- and FUNCOE- create VFUNCOE-, in setting IORA(12:04). Since VMEGO- is asserted as the default device, the default address on the IORA bus is the VMEbus address.

At the start of every I/O cache bus cycle, the address for the current contents of the I/O Cache Tag Array are driven onto the IOCDB bus. This is caused by the fact that the address generator for the I/O cache is pointing to the Tag Array, and the I/O cache array is enabled on the IOCDB bus (FIG. 8, state IDLE). If the current I/O cache contents are valid and modified, then this means that the write back address is active on the IOCDB bus. At the start of each bus cycle, this address is clocked into the data transceivers between the IORA bus and the IOCDB bus. This address will be subsequently loaded into the I/O Cache Write Back Buffer for the write back cycle, as described below.

From the IDLE state, the signal FLUSHCYCLE, block 406, indicates a Flush command from the CPU has I/O arbiter priority (FIG. 5). If a FLUSHCYCLE, block 406, is asserted, then WRITEBACKNEEDED, block 418, is tested. This is determined by reading the I/O Cache Tag Array entry and examining the Valid and Modified bits. If both bits are set, then WRITEBACKNEEDED, block 418, is set active. If WRITEBACKNEEDED, block 418, is active, then WRITEBUFFERFULL, block 434, is tested. This signal is active when the I/O Cache Write Back buffer is full, pending a write back cycle to main memory. Testing WRITEBUFFERFULL, block 434, prior to state B checks, block 436, for a pending write back from a previous I/O cache cycle. While waiting in state B, block 436, for this cycle to complete, MAPOE- and FUNCOE-, block 436, are continued, and IOLTCH-, IOTAGDRV-, and TAGWRT-, block 436, are asserted. An active IOLTCH-, block 436, latches and holds the I/O address, i.e. the VMEbus and Ethernet addresses. IOTAGDRV-, block 436, enables the I/O Mapper output to drive the IOCDB bus with the new physical address, for use in updating the I/O Cache Tag Array. An active TAGWRT-, block 436, drives the Tag Array write enable.

When the WRITEBUFFERFULL, block 434, is deasserted, indicating that the previous writeback cycle is complete, the state machine control goes to state C 1, block 422. In this state, control signals MAPOE-, block 422, FUNCOE-, IOCLTCH, IOTAGDRV-, and TAGWRT-, block 422, are asserted, along with MISS-, block 422. The actual Tag Array update occurs at the end of this cycle. The control signal MISS-, block 422, drives the Miss Address Function Generator, which generates the Valid and Modified signals, encoded in the nibble IOCDB(03:00), for both the updating the I/O Cache Tag Array and for capturing the write back address in the Write Back buffers. In state C1, block 422, for the Flush cycle, MISS-, block 422, drives the Valid and Modified bits inactive for the Tag Array update. The result of state C1, block 422, for the Flush cycle is that the I/O Cache Tag Array is now marked as invalid.

Control now passes to state D, block 424. For the Flush cycle, the write back address captured in the transceivers between the IORA bus and the IOCDB bus is written into the Write Back Buffer. In state E, block 426, the control signal SEEDATA-, block 426, is set. This signal informs the I/O Cache Control Logic to change the array address bit A9 to point to the data array portion of the I/O cache array, rather than the tag array. Control passes to state F, block 428, where it is held until the cycle completes. This is indicated by the deassertion of IOSMBSY-, block 430, set in FIG. 8, and the deassertion of DVMAAS-, block 432, set in FIG. 5.

If the test for FLUSHCYCLE, block 406, from the IDLE state, block 402, is false, then CACHEHIT, block 408, is tested. CACHEHIT, block 408, is set if the DVMA cycle hits the I/O cache. If CACHEHIT, block 408, is true, then the FIRSTWRITE, block 410, control signal is tested. This signal will be active on DVMA write cycles which write to an I/O Cache entry which is currently marked as valid but not modified. If FIRSTWRITE, block 410, is true, then the tags must be updated to set the Modified bit. This update is done in state C1, block 422 with the Miss Address Function Driver driving the Valid and Modified bits into the tag array over IOCDB(03:00). If FIRSTWRITE, block 410, is inactive for the DVMA cycle which hits the I/O cache, then no tag update is required. Control passes to state F, block 428, where it remains until the cycle is complete.

If CACHEHIT, block 408, is not true, implying an I/O cache miss, then the control signal IOCACHEDPAGE, block 412, is tested. This signal is read from the I/O Mapper. If the page is not I/O cacheable, then control passes to state C2, block 420. In C2, block 420, MAPOE-, block 420, is asserted so that the DVMA physical address can be written into the IOC Miss Address Register. Control then passes through states D and E to state F, blocks 424-428, where the state machine waits for the conclusion of the cycle.

If IOCACHEDPAGE, block 412, is active, then the signal WRITEBACKNEEDED, block 414, is tested. WRITEBACKNEEDED, block 414, indicates the presence on a valid and modified I/O cache entry present in the array. If this signal is active, the control flow is treated as in the Flush case. First, WRITEBACKFULL, block 434, is tested to see if the Write Back buffer is still busy from a previous write back cycle. If so, control loops in state B, block 436, until the buffer is cleared. Then control passes to state C1, block 422. In state C1, block 422, the tags are updated, with the tag address driven from the I/O Mapper through asserting the buffer enable IOTAGDRV-, block 422. The MISS-, signal, block 422, informs the Miss Address Function Driver to update the I/O cache Valid and Modified bits as appropriate, depending on whether the bus cycle is a read or write cycle. Control then passes to state D, block 424, where the write back address is written into the Write Back Buffer, as in the case for the Flush cycle. Next, control passes to states E and F, blocks 426 and 428, to await the conclusion of the cycle.

If WRITEBACKNEEDED, block 414, is inactive, then the control signal IORW, block 416, is tested. This signal will be active for I/O cache read cycles. If the DVMA cycle is a read cycle, then in order to assure data consistency for I/O cache data read from memory, the state machine tests whether the signal WRITEBUF-FERFULL, block 434, is active. This assures that any pending write back cycle will complete before data from the DVMA read cycle is returned. Looping in state B, block 436, until the write back cycle is complete, control can now pass to state C1, block 422. Here IOTAGDRV-, block 422, enables the physical address from the I/O Mapper onto the IOCDB bus, while the MISS-, block 422, input to the Miss Address Function Driver, is asserted. The function driver sets the Valid bit in IOCDB(03:00). TAGWRT-, block 422, updates the tag array entry. Control now passes through states D and E to state F, blocks 424–428, where the state machine loops until the end of the cycle.

If IORW, block 416, is inactive, indicating a DVMA write cycle, then control passes directly to state C1, block 422, (since WRITEBACKNEEDED is inactive). Here the tags are updated, as above, except that the Miss Address Function Driver sets both the Valid and Modified bits active. The write cycle concludes just as the DVMA read cycle, above.

We claim:

1. In a computer system comprising a central processing unit (CPU), a central cache, an input/output (I/O) cache, a memory, and a plurality of I/O devices, a method for maintaining data coherency between said central cache, said I/O cache, and said memory, said method comprising the steps of:

a) partitioning said memory into a plurality of memory segments;

b) assigning ownership for each of said memory segments to said central cache, each of said memory segments assigned to said central cache being eligible to be cached by said central cache only, but accessible by both read and write cycles of said CPU and of said I/O devices addressed to said memory;

c) classifying each of said I/O devices to one of a plurality of I/O device classes based on their logical I/O buffer and memory access characteristics;

d) allocating and deallocating said memory segments to said logical I/O buffers of said I/O devices, conditionally reassigning ownership of said memory segments being allocated and deallocated to said I/O cache and back to said central cache before said allocation and after said deallocation respectively, based on said I/O devices' classified I/O device classes, said memory segments assigned to said I/O cache being eligible to be cached by said central and I/O caches, but accessible by said read and write cycles of said I/O devices only;

e) detecting read and write cycles of said CPU and said I/O devices;

f) returning data to be read for said detected read cycles of said CPU from selected ones of (i) said central cache and (ii) said memory, and of said I/O devices from selected ones of (i) said I/O cache, (ii) said central cache, and (iii) said memory, respectively; and g) storing data to be written for write cycles of said CPU into selected ones of (i) said central cache, (ii) said memory, and (iii) both said central cache and memory, and of said I/O devices into selected ones of (i) said I/O cache and (ii) memory respectively.

2. The method as set forth in claim 1, wherein,
said central cache comprises a plurality of cache lines, each cache line having a line size of $n_1$ bytes;
said I/O cache comprises a plurality of I/O cache lines, each I/O cache line having a line size of $n_2$ bytes; and
each of said memory segments has a segment size of $n_3$ bytes, where $n_3$ equals the larger of $n_2$ and $n_1$ if $n_2$ is unequal to $n_1$ and $n_3$ equals both $n_2$ and $n_1$ if $n_2$ equals $n_1$.

3. The method as set forth in claim 2, wherein,
each of said logical I/O buffers comprising I/O cache assigned memory segments comprises at least one I/O cache assigned memory segment;
each of said logical I/O buffers comprising at least one I/O cache assigned memory segment has a physical address whose lowest $\log_2(n_3)$ bits are equal to zero and a buffer size that is in multiples of $n_3$ bytes.

4. The method as set forth in claim 3, wherein,
each of said logical I/O buffers comprising at least one I/O cache assigned memory segment has a buffer size of a memory page if it is dynamically allocated, said memory page having a page size that is in multiples of $n_3$ bytes; and
each of said logical I/O buffers comprising at least one I/O cache assigned memory segment is padded to said buffer size that is in multiples of $n_3$ bytes if it is statically allocated.

5. The method as set forth in claim 1, wherein, said step d) further comprises the steps of:
inhibiting processes executed by said CPU from causing said CPU to perform read and write cycles addressed to said allocated memory segments, and
writing all dirty data cached in I/O cache lines of said I/O cache for said memory segments being deallocated and reassigned, dirty data being normally cached in said I/O cache lines and written back into said allocated memory segments cached by said I/O cache lines when said I/O cache lines are reallocated to cache other allocated memory segments.

6. The method as set forth in claim 1, wherein, said data to be read for said read cycles of said I/O device are simultaneously stored into said I/O cache and by-passed to said I/O device if said data to be read is being returned from a selected one of (i) said central cache and (ii) memory, and the memory segments addressed by said read cycles of said I/O cache are eligible to be cached in said I/O cache.

7. The method as set forth in claim 1, wherein,
said step f) further comprises the step of invalidating all previously valid data cached in said I/O cache for said allocated memory segments after said I/O devices completed their corresponding current sequence of successive read cycles if said allocated memory segments are assigned to said I/O cache;
said step g) further comprises the step of invalidating any previously valid data cached in said central cache for said allocated memory and the step of writing all dirty data cached in said I/O cache for said allocated memory segments after said I/O devices completed their corresponding current sequence of successive write cycles, if said allocated memory segments are assigned to said I/O cache.

8. The method as set forth in claim 1, wherein, said central cache is a selected one of (i) a central write through cache and (ii) a central write back cache;

said I/O device classes comprise:
   (i) a first I/O device class whose I/O devices dynamically allocate logical I/O buffers in said memory segments, one logical I/O buffer per I/O device, said allocated memory segments being reassigned to said I/O cache, and perform sequential accesses to their dynamically allocated logical I/O buffers,
   (ii) a second I/O device class whose I/O devices statically allocate logical I/O buffers in said memory segments, a plurality of logical I/O buffers per I/O device, said allocated memory segments being reassigned to said I/O cache, and perform interleaving sequential accesses to their statically allocated I/O buffers, and
   (iii) a third I/O device class whose I/O devices perform accesses to their logical I/O buffers comprising allocated memory segments assigned to said central cache;

said allocated memory segments are addressed by said read and write cycles of said I/O devices in a selected one of physical addressing and virtual addressing.

9. A computer system comprising:
a) a memory comprising a plurality of memory segments;
b) a central cache coupled to said memory, a CPU, and a plurality of I/O devices, said central cache being assigned ownership of said memory segments, said central cache assigned memory segments being eligible to be cached by said central cache only, but accessible to read and write cycles of said CPU and said I/O devices addressed to said memory;
c) an I/O cache coupled to said memory and said I/O devices, said I/O cache being conditionally reassigned ownership of said memory segments based on classified I/O device classes of said I/O devices when said memory segments are allocated to logical I/O buffers of said I/O devices, said I/O cache assigned memory segments being eligible to be cached by said central cache and said I/O cache, but accessible to read and write cycles of said I/O devices addressed to said memory only;
d) an operating system allocating and deallocating said memory segments to said logical I/O buffers of said I/O devices, and conditionally reassigning ownership of said memory segments being allocated and deallocated to said I/O cache and back to said central cache before said allocation and after said deallocation respectively, based on said classified I/O device classes of said I/O devices;
e) said central processing unit (CPU) performing said read and write cycles addressed to said memory on behalf of process being executed by said CPU, data to be read for said read cycles of said CPU being returned from selected ones of (i) said central cache, and (ii) said memory, data to be written for said write cycles of said CPU being stored into selected ones of (i) said central cache, (ii) said memory, and (iii) both said central cache and memory; and
f) said plurality of input/output (I/O) devices performing said read and write cycles addressed to said memory, said I/O devices being classified into said I/O device classes based on their logical I/O buffer and memory access characteristics, data to be read for said cycles of said I/O devices being returned from selected ones of (i) said I/O cache, (ii) said central cache, and (iii) said memory, data to be written for said write cycles of said I/O devices being stored into selected ones of (i) said I/O cache, and (iii) said memory.

10. The computer system as set forth in claim 9 wherein, said central cache comprises a plurality of cache lines, each cache line having a line size of $n_1$ bytes;
said I/O cache comprises a plurality of I/O cache lines, each I/O cache line having a size of $n_2$ bytes; and
each of said memory segments has a segment size of $n_3$ bytes, where $n_3$ equals the larger of $n_2$ and $n_1$ if $n_2$ is unequal to $n_1$, and $n_3$ equals both $n_2$ and $n_1$ if $n_2$ equals $n_1$.

11. The computer system as set forth in claim 10, wherein, each of said logical I/O buffers comprising I/O cache assigned memory segments comprises at least one I/O cache assigned memory segment;
each of said logical I/O buffers comprising at least one I/O cache assigned memory segment has a physical address whose lowest $\log_2(n_3)$ bits are equal to zero and a buffer size that is in multiples of $n_3$ bytes.

12. The computer system as set forth in claim 11, wherein, each of said logical I/O buffers comprising at least one I/O cache assigned memory segment has a buffer size of a memory page if it is dynamically allocated, said memory page having a page size that is in multiples of $n_3$ bytes; and
each of said logical I/O buffers comprising at least one I/O cache assigned memory segment is padded to said buffer size that is in multiples of $n_3$ bytes if it is statically allocated.

13. The computer system as set forth in claim 9, wherein, said operating system inhibits processes executed by said CPU from causing said CPU to perform read and write cycles addressed to said allocated memory segments, and writes all dirty data cached in I/O cache lines of said I/O cache for said memory segments being deallocated and reassigned, dirty data being normally cached in said I/O cache lines and written back into said allocated memory segments cached by said I/O cache lines when said I/O cache lines are reallocated to cache other allocated memory segments.

14. The computer system as set forth in claim 9, wherein, said data to be read for said read cycles of said I/O device are simultaneously stored into said I/O cache and bypassed to said I/O device if said data to be read is being returned from a selected one of (i) said central cache and (ii) said memory, and the memory segments addressed by said read cycles of said I/O device are eligible to be cached in said I/O cache.

15. The computer system as set forth in claim 9, wherein, said I/O cache invalidates all previously valid data cached in itself for said allocated memory segments after said I/O devices completed their corresponding current sequence of successive read cycles if said allocated memory segments are assigned to said I/O cache;

said I/O cache further writes all dirty data cached in itself for said allocated memory segments after said I/O devices completed their corresponding current sequence of successive write cycles if said allocated memory segments are assigned to said I/O cache; and said central cache invalidates any previously valid data cached in itself for said allocated memory segments.

16. The computer system as set forth in claim 9, wherein, said central cache is a selected one of (i) a central write through cache and (ii) a central write back cache;

said I/O device classes comprise:
(i) a first I/O device class whose I/O devices dynamically allocate logical I/O buffers in said memory segments, one logical I/O buffer per I/O device, said allocated memory segments being reassigned to said I/O cache, and perform sequential accesses to their dynamically allocated logical I/O buffers, (ii) a second I/O device class whose I/O devices statically allocate logical I/O buffers in said memory segments, a plurality of logical I/O buffers per I/O device, said allocated memory segments being reassigned to said I/O cache, and perform interleaving sequential accesses to their statically allocated logical I/O buffers, and (iii) a third I/O device class whose I/O devices perform accesses to their logical I/O buffers having allocated memory segments assigned to said central cache;

said allocated memory segments are addressed by said read cycles of said I/O devices in a selected one of physical addressing and virtual addressing.

* * * * *

UNITED STATES PATENT AND TRADEMARK OFFICE
CERTIFICATE OF CORRECTION

PATENT NO. : 5,247,648
DATED : September 21, 1993
INVENTOR(S) : Watkins et al.

It is certified that error appears in the above-identified patent and that said Letters Patent is hereby corrected as shown below:

In column 31, claim 9 at line 63, please delete " process " and insert -- processes --.

Signed and Sealed this

Twenty-fifth Day of November, 1997

Attest:

BRUCE LEHMAN

Attesting Officer

Commissioner of Patents and Trademarks